(12) United States Patent
Raghuram et al.

(10) Patent No.: US 12,411,928 B2
(45) Date of Patent: Sep. 9, 2025

(54) ATTESTATION-AS-A-SERVICE FOR CONFIDENTIAL COMPUTING

(71) Applicant: Intel Corporation, Santa Clara, CA (US)

(72) Inventors: Yeluri Raghuram, Sunnyvale, CA (US); Haidong Xia, Folsom, CA (US); Uttam Shetty, Granite Bay, CA (US); Anil Rao, Menlo Park, CA (US); Sudhir Subbarao Bangalore, Bangalore (IN); Raghavender Nagarajan, Bangalore (IN); Kekuut Hoomkwap, Clarksburg, VA (US); Wei Peng, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 18/284,429

(22) PCT Filed: Jun. 24, 2022

(86) PCT No.: PCT/US2022/034906
§ 371 (c)(1),
(2) Date: Sep. 27, 2023

(87) PCT Pub. No.: WO2022/272064
PCT Pub. Date: Dec. 29, 2022

(65) Prior Publication Data
US 2024/0160717 A1    May 16, 2024

Related U.S. Application Data

(60) Provisional application No. 63/339,847, filed on May 9, 2022.

(30) Foreign Application Priority Data

Jun. 25, 2021 (IN) .............................. 202141028574

(51) Int. Cl.
*G06F 21/33* (2013.01)
*G06F 21/53* (2013.01)
*G06F 21/57* (2013.01)

(52) U.S. Cl.
CPC .............. *G06F 21/33* (2013.01); *G06F 21/53* (2013.01); *G06F 21/57* (2013.01); *G06F 2221/034* (2013.01)

(58) Field of Classification Search
CPC ........... G06F 2221/034; G06F 21/6218; G06F 21/64; H04L 9/3234
See application file for complete search history.

(56) References Cited

U.S. PATENT DOCUMENTS 11,037,118 B2 *   6/2021   Kraemer ................ G06N 5/013
11,122,346 B1 *   9/2021   Kumar ................ H04L 63/0853
(Continued)

FOREIGN PATENT DOCUMENTS

| CN | 117121006 | 11/2023 |
|---|---|---|
| KR | 20210061541 A | 5/2021 |
| WO | WO-2022272064 A1 | 12/2022 |

OTHER PUBLICATIONS

"U.S. Appl. No. 18/284,429, Preliminary Amendment filed Sep. 27, 2023", 7 pages.

(Continued)

*Primary Examiner* — Beemnet W Dada
(74) *Attorney, Agent, or Firm* — Schwegman Lundberg & Woessner, P.A.

(57) ABSTRACT

Various systems and methods are described for implementing trust authority or trust attestation verification operations, including for Trust-as-a-Service or Attestation-as-a-Service implementations, in accordance with the techniques discussed herein. In various examples, operations and configurations are described to enable service-to-service attestation (Continued)

using a trust authority, to operate an attestation service, and to coordinate trust operations between relying and requesting parties.

20 Claims, 21 Drawing Sheets

(56) References Cited

U.S. PATENT DOCUMENTS

| | | | | |
|---|---|---|---|---|
| 12,132,844 | B1* | 10/2024 | Allen | H04L 9/3265 |
| 2017/0251025 | A1 | 8/2017 | Varley et al. | |
| 2018/0096412 | A1* | 4/2018 | Scott-Nash | G06Q 30/0635 |
| 2018/0315026 | A1 | 11/2018 | Kraemer et al. | |
| 2019/0327096 | A1 | 10/2019 | Liu et al. | |
| 2020/0084202 | A1* | 3/2020 | Smith | H04W 12/08 |
| 2020/0344265 | A1* | 10/2020 | Kelly | H04L 63/0823 |
| 2022/0394054 | A1* | 12/2022 | Sheth | H04L 63/10 |
| 2023/0297410 | A1* | 9/2023 | Sood | G06F 9/45558 |
| | | | | 718/1 |

OTHER PUBLICATIONS

"International Application Serial No. PCT US2022 034906, International Preliminary Report on Patentability mailed Jan. 4, 2024", 7 pgs.

"European Application Serial No. 22829386.6, Extended European Search Report mailed Mar. 20, 2025", 12 pgs.

Kirkman, Stephen S, "Bridging the Cloud Trust Gap Using ORCON Policy to Manage Consumer Trust between Different Clouds", IEEE International Conference On Edge Computing (EDGE), IEEE, (Jun. 25, 2017), 82-89.

"International Application Serial No. PCT/US2022/034906, International Search Report mailed Oct. 13, 2022", 4 pgs.

"International Application Serial No. PCT/US2022/034906, Written Opinion mailed Oct. 13, 2022", 5 pgs.

"European Application Serial No. 22829386.6, Response Filed Apr. 28, 2025 to Extended European Search Report mailed Mar. 20, 2025", 20 pgs.

* cited by examiner

ATTESTATION-AS-A-SERVICE FOR CONFIDENTIAL COMPUTING

PRIORITY CLAIM

This application is a U.S. National Stage Application under 35 U.S.C. 371 from International Application No. PCT/US2022/034906, filed Jun. 24, 2022, published as WO 2022/272064, which claims the benefit of priority to India Provisional Patent Application No. 20/214,1028574, filed Jun. 25, 2021, and to U.S. Provisional Patent Application No. 63/339,847, filed May 9, 2022, each of which is incorporated herein by reference in its entirety.

TECHNICAL FIELD

Embodiments described herein generally relate to data processing in networked computing environments, and in particular, to the use of confidential computing technologies for trust, verification, and attestation of computing entities and assets.

BACKGROUND

Confidential Computing generally refers to a category of approaches which provides protection of software services, such as through the use of Trusted Execution Environments (TEEs) and attestation. Attestation, as applied in a networked computing setting, is a mechanism that allows a relying party to verify the integrity of a remote software (e.g., executing in a TEE) by evaluating hardware-based evidence generated by the remote software. For instance, at a high level, if the relying party knows the architecture of a distributed software, it can attest each one of its services.

Attestation of single software services is a powerful integrity verification mechanism. However, modern software is rarely comprised of one or a few services. Tens and hundreds of services can be involved in a distributed software deployment, and each service can have many instances for scaling purposes. Attesting each instance of every service can quickly become unmanageable. Moreover, to fully ensure trust and security, the relying party must have an intimate knowledge of the architecture of the distributed software and be notified when a new instance joins the distributed software. Compounding the problem is the fact that a relying party must be able to attest all the instances of all the services of the distributed software even if that communication is not required functionally, which broadens the attack surface. Because of these reasons, attestation initiated by a relying party does not scale well in many types of real-world computing deployments, such as those provided by "edge computing" and related "edge", "edge-cloud", and "near-cloud" environments.

Edge computing, at a general level, refers to the transition of compute and storage resources closer to endpoint devices (e.g., consumer computing devices, user equipment, etc.), in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
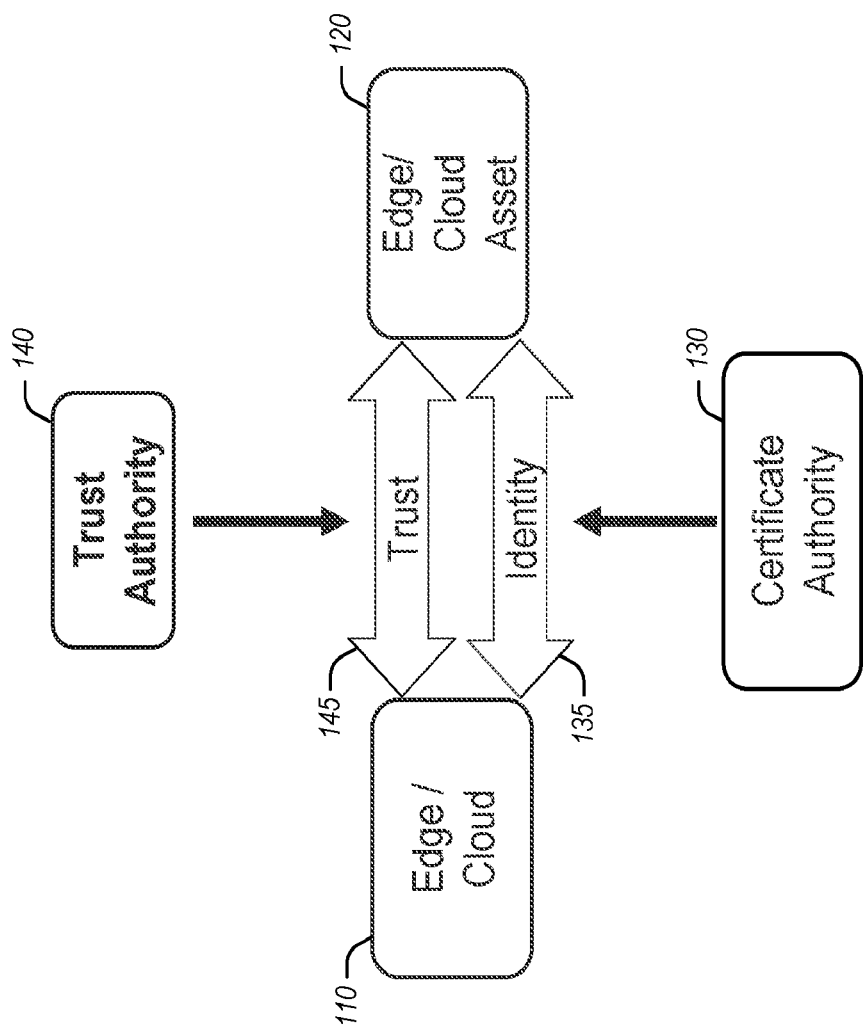
FIG. 1 illustrates a simplified system overview providing a comparison of trust and identify verification, according to an example.

In the following description, methods, configurations, and related apparatuses are disclosed for features of an extensible SaaS (Software as a service) deployment, that provides verification of evidence for TEEs, platform and device integrity, and accompanying services and applications. This SaaS deployment, referred to herein as "Trust-as-a-Service" (TaaS), uses confidential computing technologies to offer trust verification in addition to other security techniques.

The following description (e.g., discussed with reference to FIGS. 1 to 6) includes an overview of confidential computing and the relevant context and use cases for trust verification. Such verification is provided from a "trust authority" operated by the TaaS deployment, such as is implemented with a TaaS software stack and with a service mesh architecture. Thereafter, additional discussion and use cases are provided relating to an attestation service (e.g., discussed with reference to FIGS. 7 to 13) including for the use of attestation between entities located at different cloud service providers. Finally, additional examples are provided with an overview of edge and cloud computing deployments (e.g., discussed with reference to FIGS. 14 to 21), including technologies and platforms to implement the following approaches.

Trust and Confidential Computing Overview

Confidential computing technologies may be deployed with the present techniques to establish trust for a variety of entities and assets, in whatever form that such entities and assets are embodied. For instance, the following approaches can provide a trust authority service, independent of cloud service providers (CSPs). Among other use cases, this may allow CSPs to be kept out of the trust boundary by executing workloads in Trusted Execution Environments (TEEs), and also verifying such TEEs via attestation.

In current computing systems, most CSPs self-attest to the security and validity of their own resources. This often reduces confidence for respective cloud tenants, and prevents use of a multi-cloud solution. The present approaches provide an independent method to provide a trust infrastructure for assets and entities, and attest to the security of such assets and entities.

As used herein, a compute "asset" which is the subject of the attestation and trust verification may relate to any number or type of features or entities in or associated with a computing system. This may be, for instance, hardware, firmware, software, network operations, data, a data set, a particular instance of data (e.g., a workload) a particular instance of software (e.g., virtualized components), and similar designated or defined portions thereof. Additionally, an asset that is subject to attestation and trust verification may be used, instantiated, accessed, or verified as part of system operation, management, administration, configuration, or other use cases. Thus, at a broad level, an asset that is subject to trust verification and attestation may be any "thing" in a computing environment that is observable by another entity. For instance, many of the following examples refer to the attestation of a workload as trusted, and performing some operation (e.g., executing the workload, unencrypting some data) as a result of successful attestation. Other use cases for access, retrieval, storage, or transmission of data (or other operations) may also be implemented.

FIG. 1 depicts a simplified system overview for the use cases discussed herein, providing a comparison of trust and identify verification. As shown, the following SaaS implementation 100 of a Trust Authority (TA) 140 provides remote verification of the trustworthiness for each asset 120 used with an edge/cloud deployment 110, including compute assets, based on use of attestation, policies and reputation/risk data. The following SaaS implementation of the TA 140 is operationally independent from the Cloud/Edge infrastructure provider that is hosting confidential compute customer workloads.

In this setting, the TA 140 is an entity that issues digital trust certifications (in the form of, for example, a JWT token (JSON Web Token) or other digital certification), to establish trust verification procedures 145 between the edge/cloud 110 consumer and the edge/cloud asset 120. For instance, the digital certification can certify the trustworthiness of a particular compute asset used to execute a workload for the consumer.

The role of the TA 140 is similar to that of a certificate authority 130 (CA), such as for a CA that issues cryptographic digital certificates to establish identity verification procedures 135. However, the role of the TA 140 is to confirm the trust level or trustworthiness of the asset 120. As will be understood, proving trustworthiness is a function of three principles: (1) attestation—which includes verifying the identity of the asset; (2) policy—where a customer can indicate what policy needs to be verified as part of trust evaluation; and (3) reputation—which comes from situation analysis or repudiation data from a third party.

In an example, the TA 140 may be provided from an edge or cloud service implemented in a software as a service (SaaS) model. For instance, the TA 140 can be configured to issue digital trust certification on demand, only if the TA 140 successfully verifies the asset 120 (e.g., a compute asset) based on remote attestation operations, policy validation, and data such as reputation or risk information.

In an example, the TA 140 is operationally independent from the cloud and edge infrastructure service provider that is hosting the confidential computing workloads. This enables delinking of the attestation provider and infrastructure provider.

The following examples refer to the use of a TA configured for verifying the trustworthiness of components using Intel® secure computing technologies, such as TEEs implemented with Intel® SGX and TDX technologies. However, the present approaches are also applicable to a variety of other TEEs and secure computing components from other manufacturers, such as AMD® SEV and ARM® realms. Thus, it will be understood that the following approaches are not limited to deployments with Intel® or x86 technologies.

Figure 2:
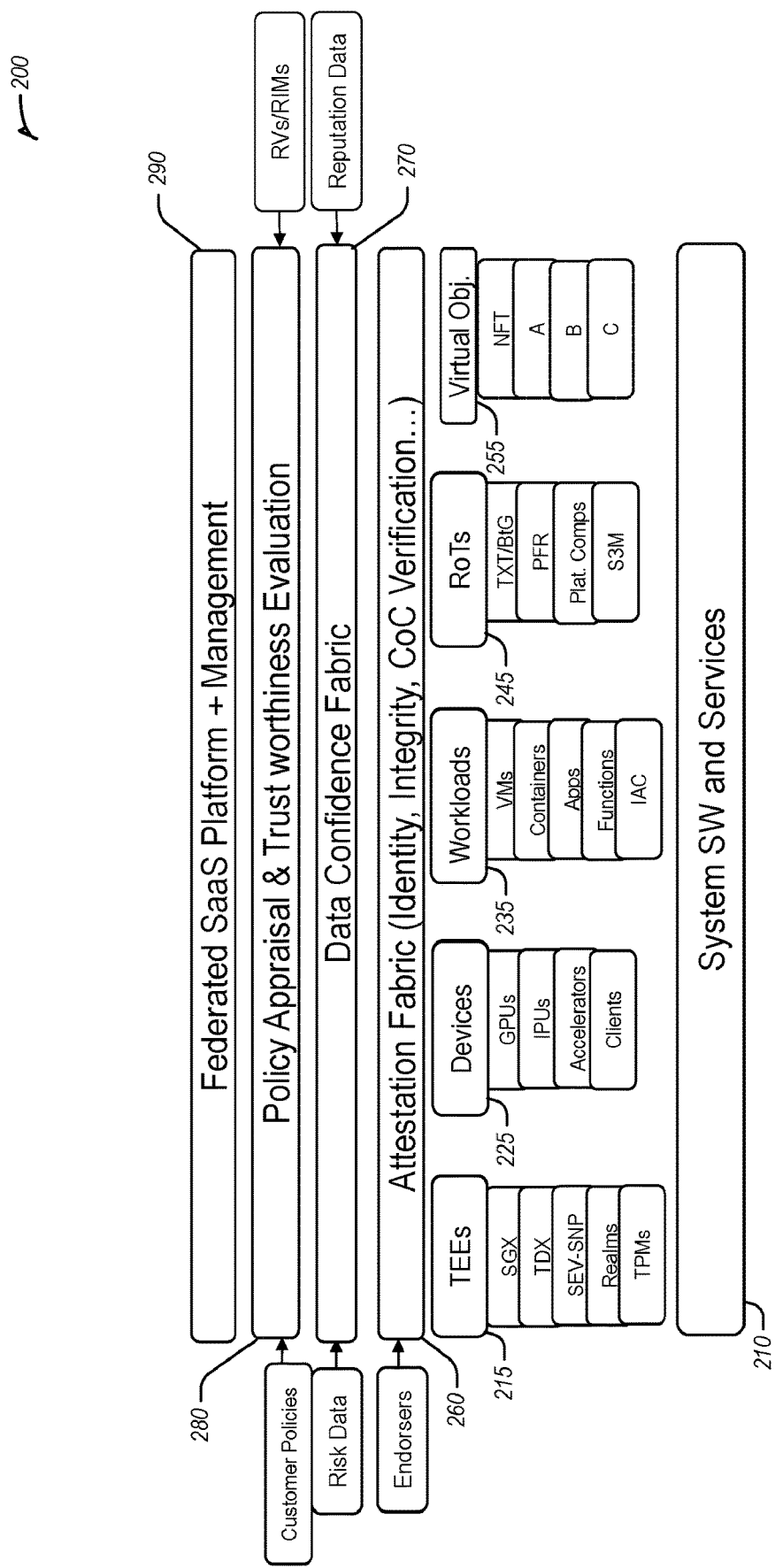
FIG. 2 illustrates hardware and functional components used in connection with operations of a trust authority, according to an example.

FIG. 2 illustrates hardware and functional components 200 used in connection with operations of a TA. This diagram specifically depicts a SaaS implementation of a TA that provides remote verification of the trustworthiness of a number of compute assets.

In these components 200, the attestation fabric 260 is the initial layer that provides verification of identity, which works in operation with the higher layers (data confidence fabric 270, policy appraisal and trustworthiness evaluation 280) which perform the reputation and appraisal of the customer policy. Further, as discussed in the examples below, the SaaS platform may be configured for federated operation and management, using federation components 290.

As an example, the TA can support different types of attestation, based on what compute asset a user wants to verify. These may include attestation of the compute assets depicted in FIG. 2, such as:

Attestation of one or more Platform software components 210, which verifies the platform firmware, OS and other software while the host is booted.

Attestation of one or more TEEs 215. This includes the verification of a secure enclave (e.g., Intel® SGX enclave), trust domain-supported virtual machine (e.g., Intel® TDX VM), and other types of TEEs including AMD® SEV_SNP, and others.

Attestation of one or more devices 225. For instance, this may include verifying the firmware on different type of devices.

Attestation of Workloads 235, such as VMs, containers, apps, functions, etc.

Attestation of one or more roots of trust 245.

Attestation of one or more virtual objects 255, such as various non-fungible tokens (NFTs).

Users can define policies (customer policies) used to verify against these compute assets, with the policy appraisal and trustworthiness evaluation functions 280. The TA can also integrate the compute asset based on risk or reputation data, such as in the data confidence fabric 270.

Thus, with use of the framework depicted in FIG. 2, verification of trust of devices that connect to the platform can be provided including for infrastructure processing units (IPUs), GPUs, accelerators, and the like. Trustworthiness verification can also be provided for all types of workloads whether they are VMs, containers, since the integrity and identity of the workload are attested and verified as part of the trust authority. Likewise, Trustworthiness verification can be provided for roots of trust (RoTs), which are anchors on which the goodness of the platform is verified. Finally, trustworthiness verification may be provided for virtual objects such as NFTs, including in scenarios where authenticity of ownership is verified during creation and transfer of an NFT.

Based on this configuration, a trustworthiness score can be generated provided as a signed token by the trust authority, so that customers can use the signed token to make decisions of their respective workloads. The SaaS platform can provide intuitive features to interface with the Trust Authority, including third party management tools such as security information and event management (SIEM) tools.

It will be understood that other variations may be provided to the components 200 and layers depicted in FIG. 2 for a particular TaaS deployment, based on the different HW, specific devices, TEEs and different ROTs, in use. Fewer or more components may also be provided. However, it will be understood that this architecture provides an extensible way for deploying trust verification of a variety of hardware, software, workloads, and data.

Figure 3:
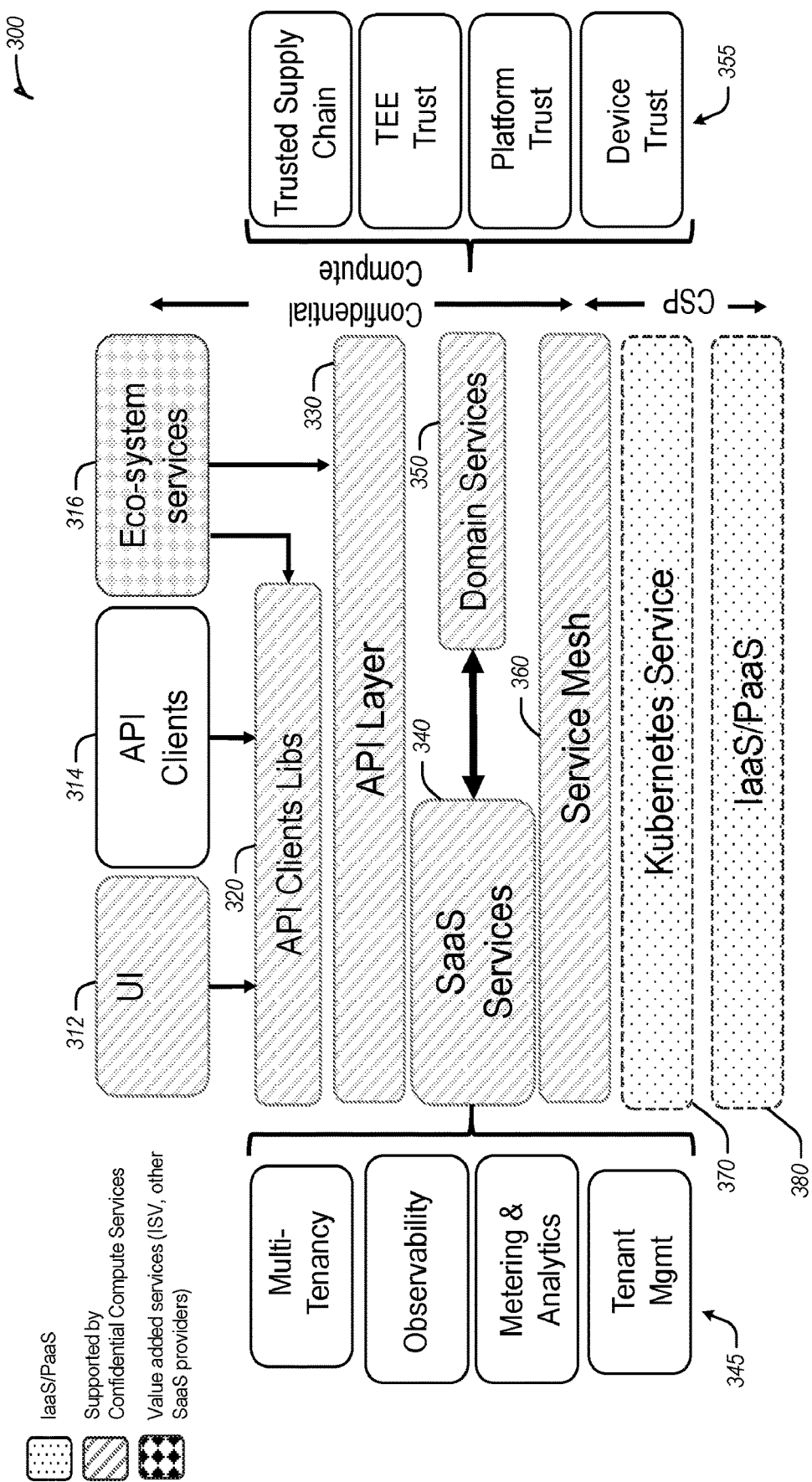
FIG. 3 illustrates a software stack used in connection with trust verification services, according to an example.

FIG. 3 depicts an example software stack 300 used in connection with trust verification services, for providing the presently disclosed TaaS architecture. As shown, the services here are built on top of standard containerized architectures (e.g., Kubernetes, K8S services 370) which is offered by many service providers (e.g., an Infrastructure-as-a-Service/Platform-as-a-Service cloud or edge compute provider 380). This software stack is built with cloud native architecture with integration to a service mesh 360, so that many aspects of scale, security, load balancing are moved out of domain services into the service mesh 360. Accordingly, domain services (including business logic and infrastructure logic) can be moved to management by the service mesh 360.

In the software stack 300, typical software-as-a-service (SaaS) instances 340 and domain services 350 can be provided, which are coordinated with service operation features 345 (e.g., multi-tenancy, observability, metering and analytics, tenant management). Above these services, various layers of APIs (e.g., API layers 330, API client libraries 320) allow different parties to interface and consume the services (including with user interfaces 312, API clients 314, eco-system services 316, and the like).

The TaaS architecture discussed herein may be extended to introduce trust from confidential compute technologies 355 into operations at any of layers 360, 350, 340, 330, 312, 314, 316. At a simplified level, this may include trust established with: a trusted supply chain; TEE trust; platform trust; and device trust.

As will be understood, different independent software vendors (ISVs) may wish to interface and provide value added services on top of the various TaaS APIs and features. This may be provided through a variety of observability, metrics, and analytics services. Thus, one possible deployment of TaaS is through the use of an ecosystem of service providers who can interface to the TaaS APIs, to obtain access to select data, as the TaaS provides value-added service (including coordinated operations and revenue events with ISVs).

A variety of use cases may be provided for the TaaS architecture and services discussed herein. These may include, for instance:

For Enterprise Users: Trust Verification prior to releasing keys to Confidential Compute workloads (e.g., in connection with AI Model Inferences);

For ISVs: Privacy preserving Data Distribution (e.g., with encrypted messaging, or other apps and services which require end-to-end security);

For Multi-Party Computing: Trusted Federated Machine Learning

For Cloud Service Providers (CSPs): Trust Verification of Telecommunications/communication service providers (CoSPs) Infrastructure for CSP use; and For Blockchain Use Cases: Node/Object verification before admitting to blockchain networks. For example, trust verification could be implemented at a client, server, or other entities wanting to become part of blockchain network. Consider a use case with a customer, requiring an entity has to have certain security properties before joining the blockchain network. The TaaS service discussed herein can provide security properties, while existing systems in the network validate the properties. Thus, if an entity is convinced a new actor is trusted and verified, the new actor can become a trusted part of the network.

For NFT Use Cases: Verification of trust when an entity is transferring ownership of an NFT or other virtual object from one entity to another. Before an entity takes ownership, the TaaS services discussed herein can be used to verify that a "chain of custody" exists from the original creator (original owner) to the current owner, who is verified. A verification of a "chain of custody" can be applied to other settings and use cases as well.

Figure 4:
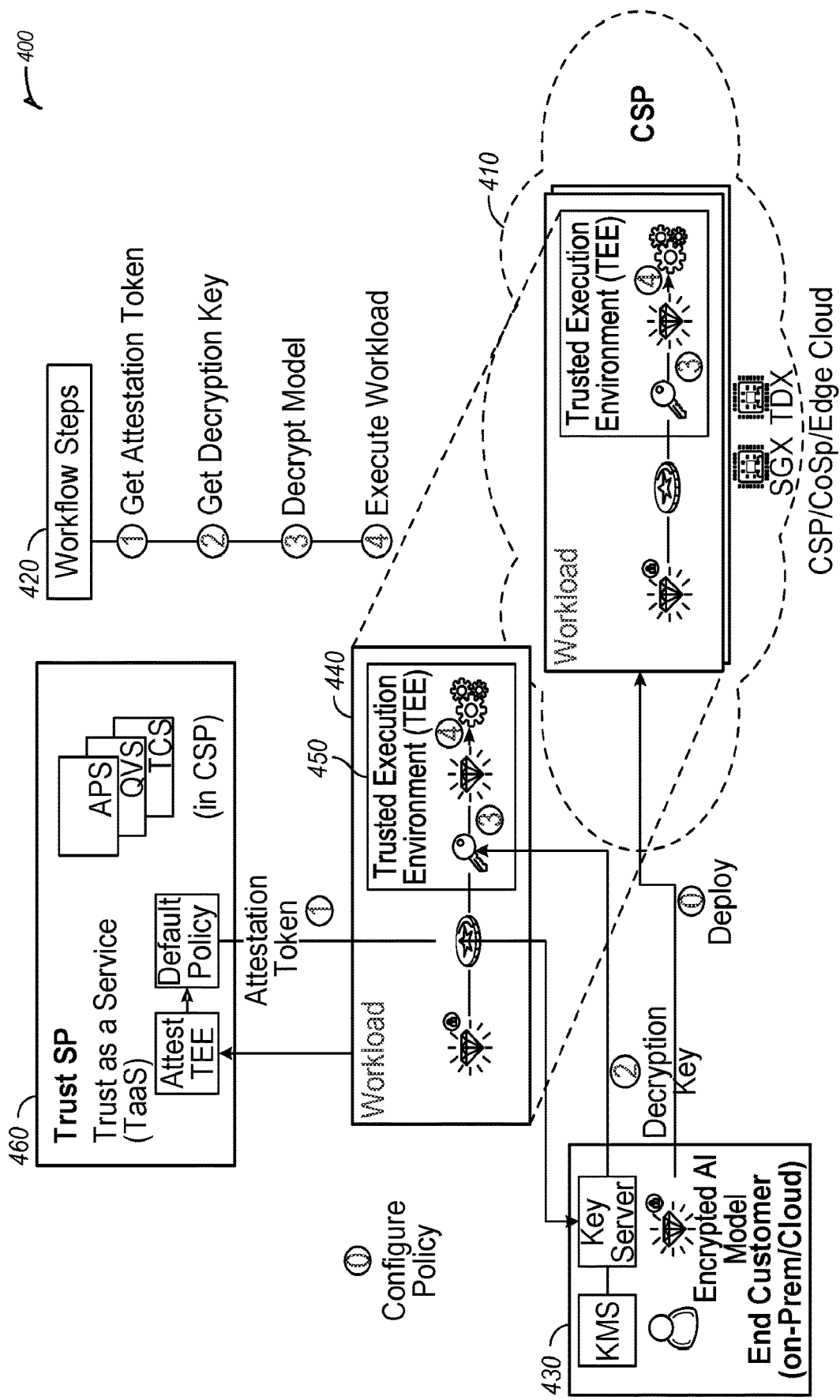
FIG. 4 illustrates a use case for trust verification for a key release procedure at a cloud service provider, according to an example.

FIG. 4 illustrates a use case for trust verification for a key release procedure 400 at a cloud service provider (CSP) 410, according to an example. Here, the CSP 410 uses confidential computing technologies (e.g., including encryption tied to an attestation-protected key) to securely perform a workflow 420 with trust verification.

In this setting, the CSP 410 may need to perform all steps of the workflow 420 before executing a workload 440 with a decrypted model in a trusted execution environment 450, on behalf of an end customer 430. The workload 440 is executed after obtaining an attestation token from a TaaS instance at a trust service provider 460 (e.g., operating at another CSP), and using the attestation token to obtain a decryption key that decrypts the model.

Figure 5:
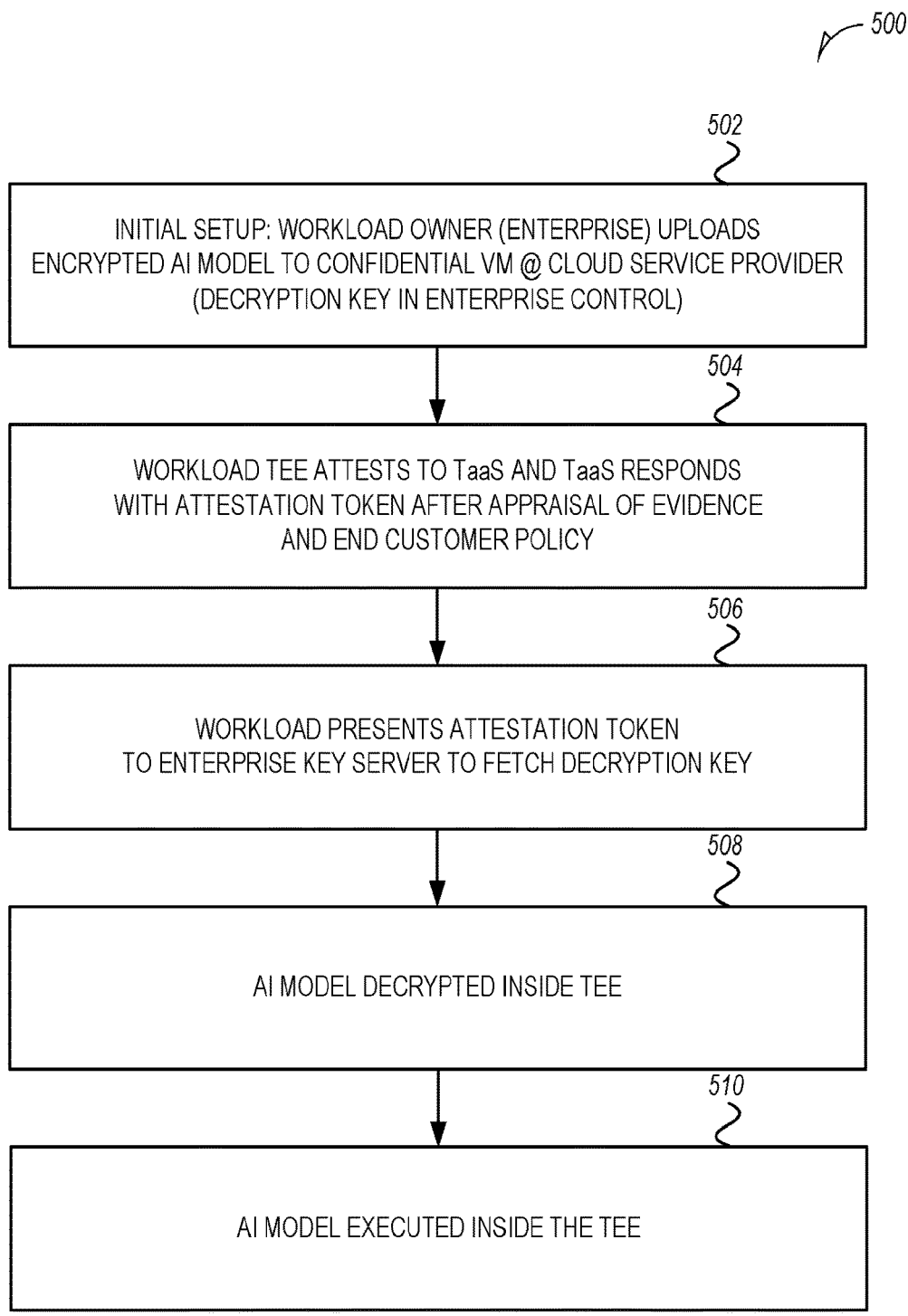
FIG. 5 illustrates a flowchart of a workflow for trust verification for execution of a workload (an artificial intelligence (AI) model) using a Trust-as-a-Service system, according to an example.

FIG. 5 illustrates a flowchart 500 of an example workflow for trust verification for execution of a workload (an artificial intelligence (AI) model) using a Trust-as-a-Service system. For instance, this provides more detail on the procedure depicted in FIG. 4, for use of a particular workload deployed with use of a protected AI model.

At operation 502, in an initial setup: a workload Owner (Enterprise) uploads an encrypted AI model to a Confidential VM at the CSP (keeping the decryption key in Enterprise control).

At operation 504, the Workload TEE attests to the TaaS instance, and the TaaS instance responds with an Attestation Token after appraisal of evidence and the end customer policy.

At operation 506, the workload presents the Attestation Token to the Enterprise Key Server, to fetch a decryption key.

At operation 508, the AI Model is decrypted inside TEE, using the retrieved decryption key.

At operation 510, the AI Model is executed inside the TEE.

In an example, the TaaS features may be implemented across services used in a service mesh architecture. For example, the following approaches for verification ensures that all the services that are part of a distributed software run in a TEE and are attested and verified before they can process end users' requests. Beside adjusting verification policies, no changes in the architecture of the solution are required to handle changes in the size of the distributed software, the number of instances per service and the interaction between the instances of the services. This allows the solution to scale and support very dynamic distributed software such as cloud native deployments.

Figure 6:
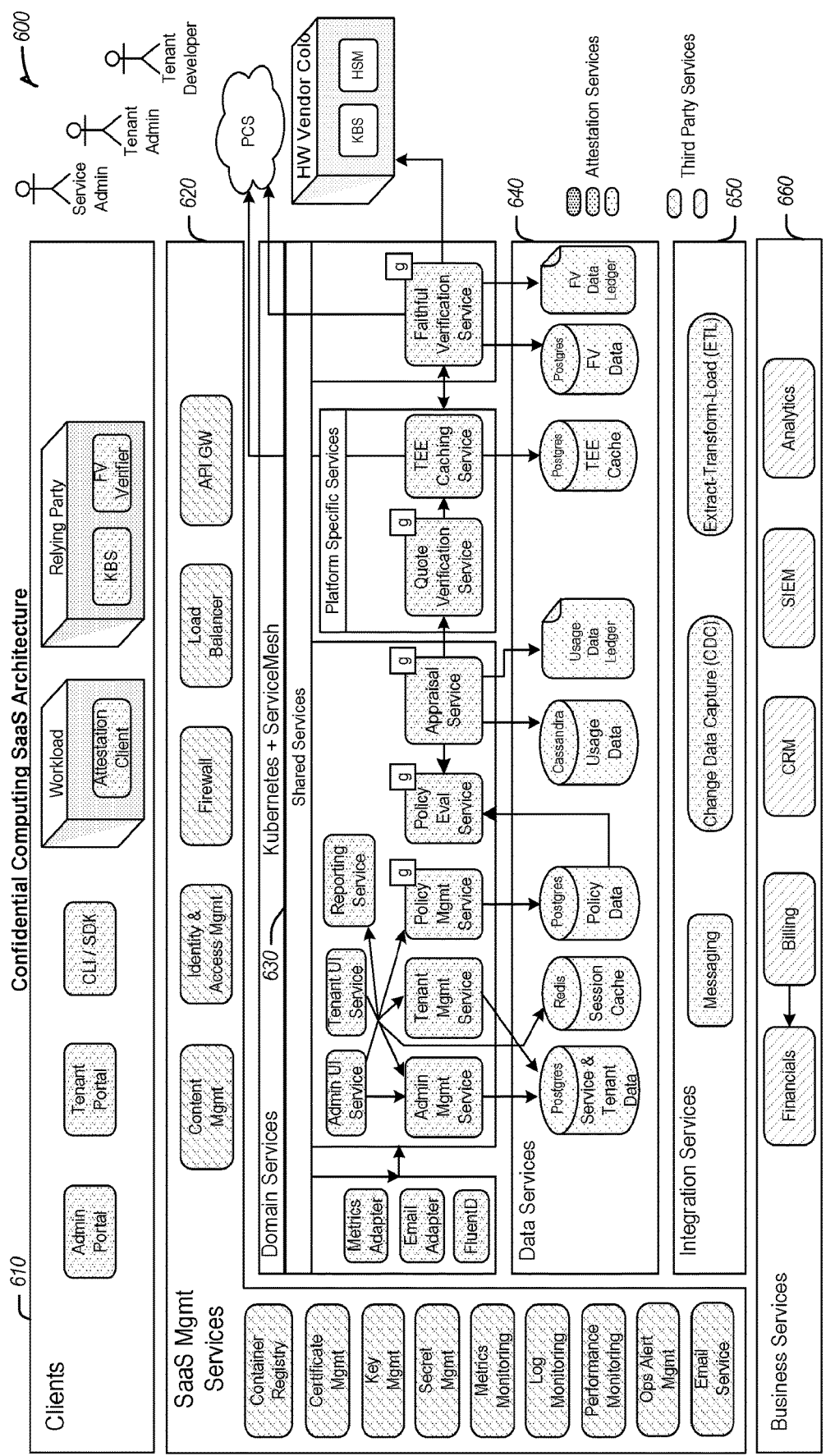
FIG. 6 illustrates an overview of an end-to-end architecture for implementing trust as a service in a Software-as-a-Service (SaaS) deployment, according to an example.

FIG. 6 illustrates an overview of an architecture 600 for implementing TaaS features in a SaaS deployment. Here, a number of clients 610 (workloads, relying parties, portals) are operated by users (e.g., such as one or more admins) to consume and operate the features of the SaaS deployment. The SaaS deployment may include the following categories of services, operated by a third party or by an attestation service provider, to provide the TaaS features: management services 620; domain services 630 (including shared services for attestation); data services 640; integration services 650; and business services 660. Additional or alternative services may also be used.

Attestation Services Implemented with Trusted Execution Environments

Remote Attestation provides irrefutable proof that verifies the identity of the platform and workloads, and that they are behaving as expected. As noted above, attestation may be applied to various forms of TEEs such as Intel® Software Guard Extensions (SGX), Trust Domain Extensions (TDX), etc., as well as platform integrity capabilities including trusted supply chain capabilities.

Cloud Customers are increasing demanding the use of multiple CSPs which are not in the same trust boundary or trusted domain for their workloads and data. Further, cloud customers do not want the CSPs to provide their own attestation, but would rather use an independent third party to provide crucial attestation verification.

As noted above, the establishment of trust via an accompanying trust service offers a critical need (e.g., requirement or prerequisite) that customers might use in a variety of settings. In particular, customers may require verification of the trustworthiness of different platforms and the workloads, before they release sensitive data, keys, and secrets into that workload. Due to the nature of trust, attestation offers a mechanism to supply multiple assertions of claims that can be used by customers (relying party) to make decisions on whether to proceed.

More and more customers are deploying applications using cloud native technologies and leveraging cloud native services for capabilities. Customers thus would expect attestation services to be available as a cloud native services with industry standard REST APIs, multi-tenancy, and scalability. Attestation solutions are still early stage, but most service providers provide solutions only for their customer base or proprietary deployment. The customers of these service providers would like a trusted third party to provide attestation so that they can independently verify the trustworthy of their workloads on these service providers. Further, with the emergence of confidential computing requirements and use cases, the need for trust (and attestation services) is growing significantly, and the need for independent services is extremely high.

Attestation services may become mission critical for successful deployment of many confidential computing applications. Requirements are increasing from cloud and edge customers for verification of trust worthiness of platform and services are increasing. Existing approaches for attestation, however, are CSP dependent, and customers still must rely on the individual CSPs for nearly all forms of attestation, monitoring, and security controls. Building on the concepts above, further features are enabled in the following for the establishment of a trust authority, an attestation service, and SaaS-based architecture for extensibility and flexibility for use cases particularly involving TEEs.

As noted above, the concept of trust authority is similar to the model of identity from a certificate authority, where third party vendors (with established authority and trust) provide the service of issuing certificates (e.g., x.509) and associated management service in the industry. An application or customer can verify the identity and legitimacy of a service certificate from a vendor (e.g., bank), by using an independent third party certificate authority. In the same manner, a trust authority can provide certification of platform integrity, workload identity, and security of its execution environment (whether it is running inside a TEE or otherwise) through a third party or CSP-independent service provider. The movement of an attestation service to a trust authority achieves the above objectives in the following examples using different levels of attestation, platform attestation, TEE (e.g., SGX or TDX) attestation, and various add-on services.

Figure 7:
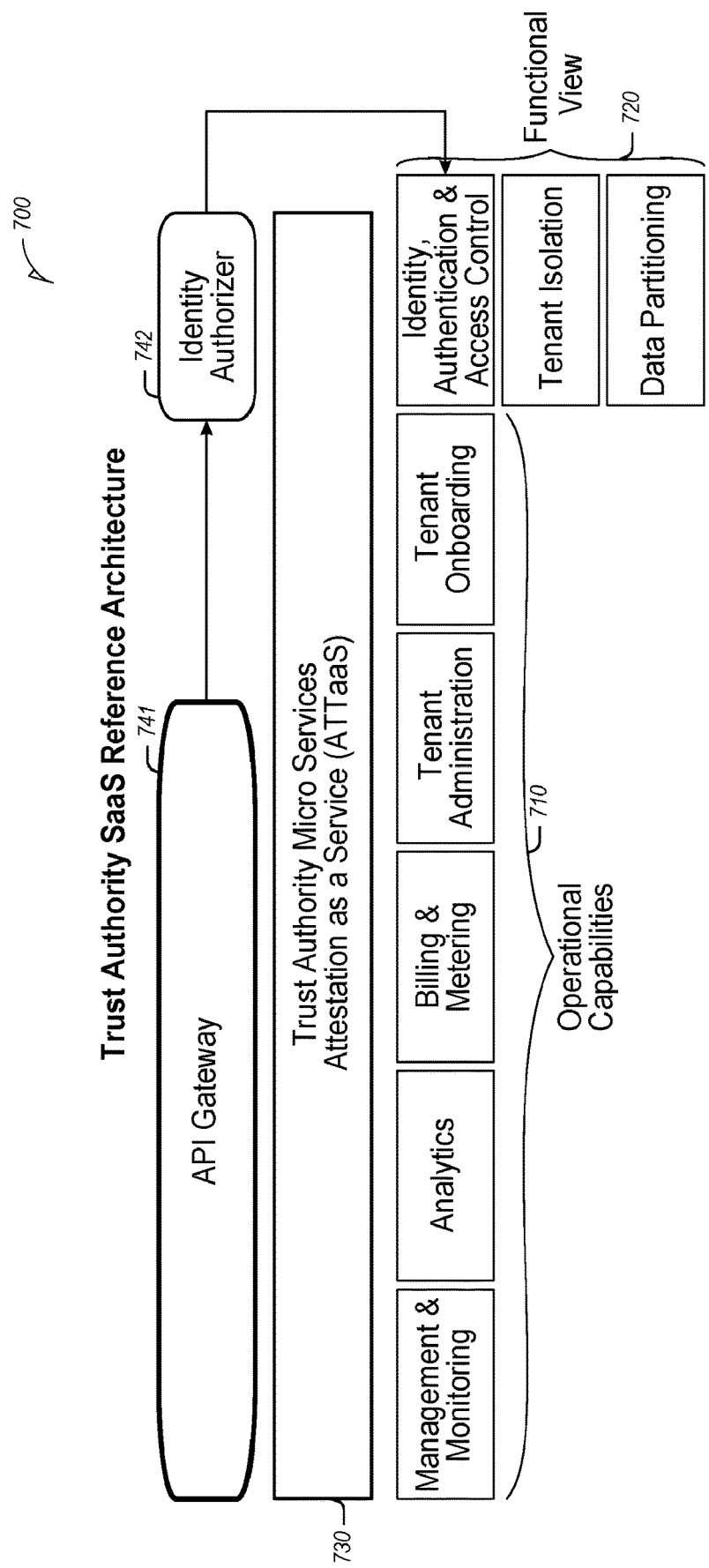
FIG. 7 illustrates a reference architecture for a trust authority, providing Attestation-as-a-Service, according to an example.

FIG. 7 illustrates a reference architecture 700 for a trust authority, providing "attestation as a service" (ATTaaS). This implementation of ATTaaS provides a simplified view of the architecture components illustrated above with reference to FIG. 6, focusing on a specific set of operational capabilities 710 used by core services in the microservices 730, and functions 720 which are operated by the microservices 730. Here, the microservices 730 may be accessed via an API gateway 741 which uses an identity authorizer 742 to access the respective functions and core services. In an example, the reference architecture 700 may execute the microservices 730 to provide trust authority capabilities via the core services and peripheral services for other capabilities. The use of a microservice model aligns with industry trends and has many benefits including cloud native deployment, performance scaling, management agility, and extensibility.

In an example, the reference architecture 700 is CSP independent. In other words, the reference architecture 710 can be deployable in different clouds without CSP lock-in. For instance, all of the components illustrated in FIG. 7 may be microservices deployed in a Kubernetes cluster, operable at a variety of CSPs. A trust authority using the architecture 700 may offer ATTaaS services to be used by for multiple (different) customers at multiple (different) CSPs. Thus, the trust authority may provide not only the core service (illustrated as ATTaaS microservices 730), but also use the operational capabilities 710 such as management, analytics, billing, tenant management and the functions 720 such as identity management, authentication and authorization, isolation, data partitioning, etc.

Figure 8:
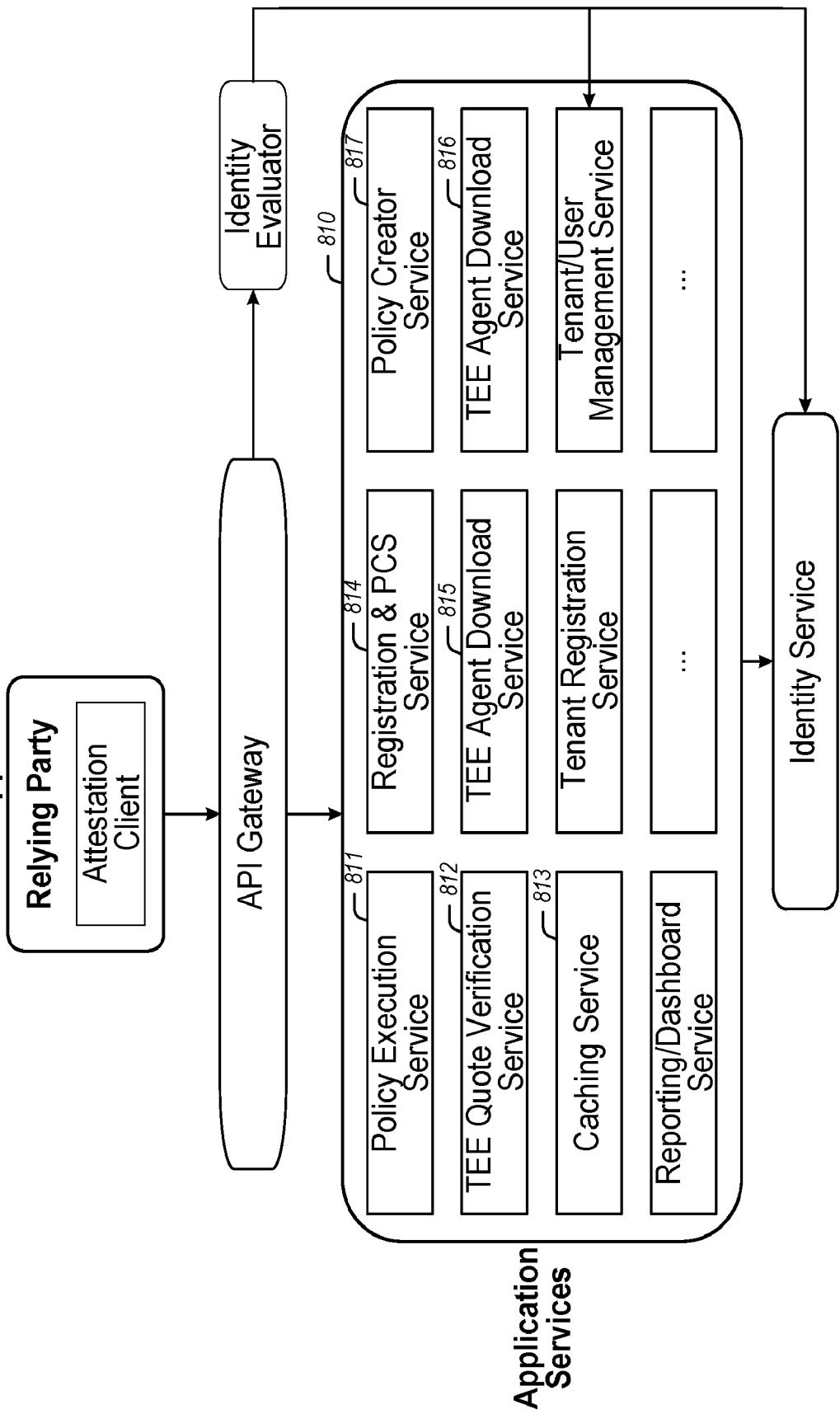
FIG. 8 illustrates a Trusted Execution Environment attestation service composed of multiple microservices, according to an example.

In an example, three different attestations are provided from the ATTaaS configuration: TEE attestation (e.g., an attestation service for SGX or TDX use cases), platform and device attestation, and transparent supply chain attestation. FIG. 8 specifically illustrates individual components related to TEE attestation for application microservices.

FIG. 8 illustrates a TEE (Trusted Execution Environment) attestation service which is composed of multiple microservices 810, including: a policy execution service 811, a quote verification service 812, a caching service 813, a registration and PCS service 814, TEE agent services 815, 816, a policy creator service 817, among others.

Each of the microservices 810 provide specific functions in the attestation flow. Further, each of these microservices may be implemented as cloud native, to be scaled out per performance requirement. Further examples may provide service-to-service attestation using trust authority approaches, outlined above.

Figure 9:
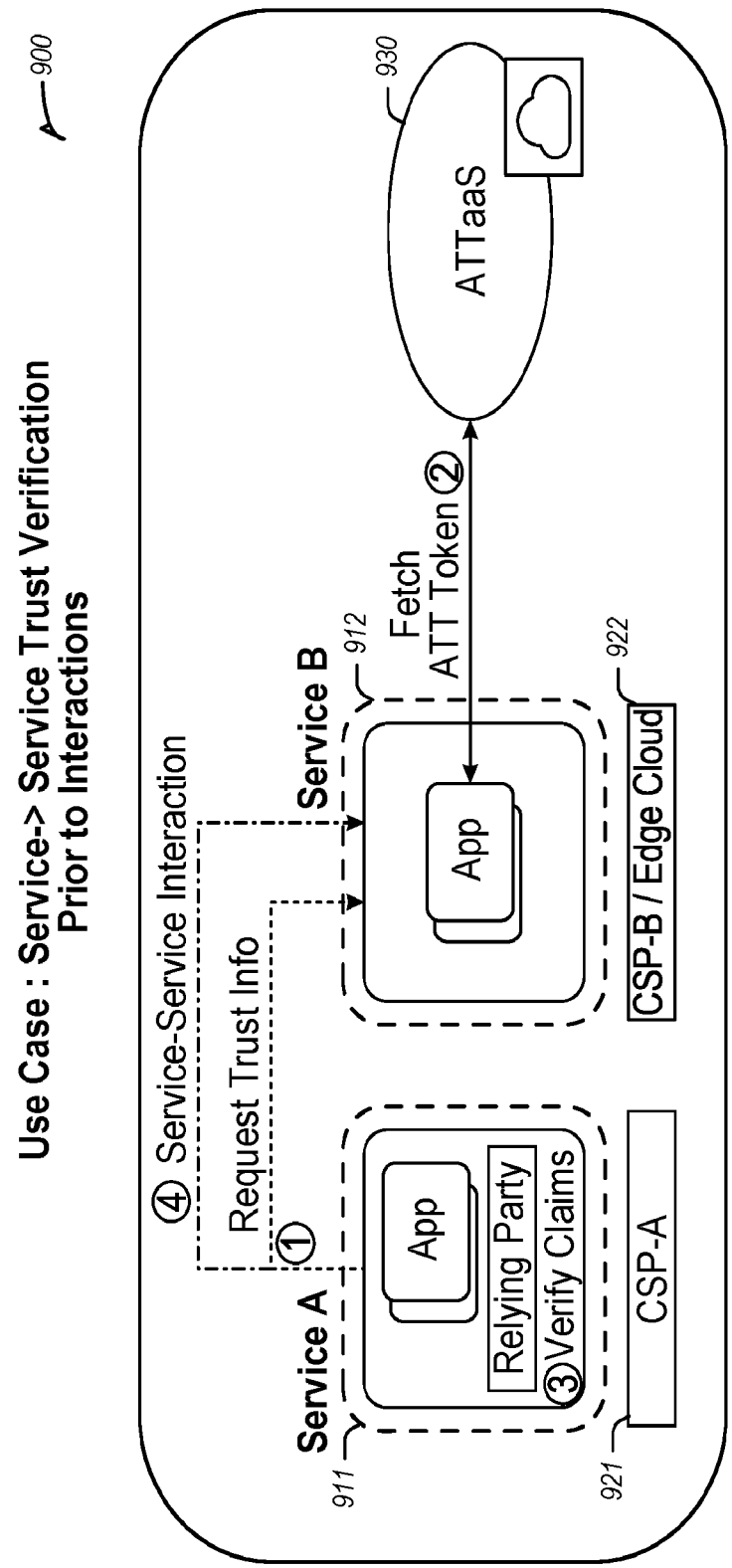
FIG. 9 illustrates a use case for a trust authority providing an Attestation-as-a-Service instance, according to an example.

As will be understood, the present techniques may apply to a variety of use cases which perform attestation with a trust authority. FIG. 9 illustrates a particular use case 900, in which the trust authority provides an ATTaS trust authority 930, to provide attestation required for establishing secure communications between two different services deployed in different CSPs (service A 911 operated by CSP A 921, and service B 912 operated by CSP B 922).

Traditionally, a mutual TLS session and an authentication and authorization scheme would be relied on for secure communication between the two services 911, 912. With the help of the ATTaaS trust authority 930 (e.g., operating in the cloud at another cloud service provider), additional mutual service attestation can be provided. For instance, the mutual service attestation performed by the ATTaaS trust authority 930 can be used to ensure that both services 911, 912 are running in a valid trusted execution environment (such as in a SGX enclave or with TDX features). Accordingly, a CSP dependency for trust requirements may be validated with the ATTaaS trust authority 930, allowing the mutual attestation of services running in different clouds (at CSPs 921, 922).

Figure 10:
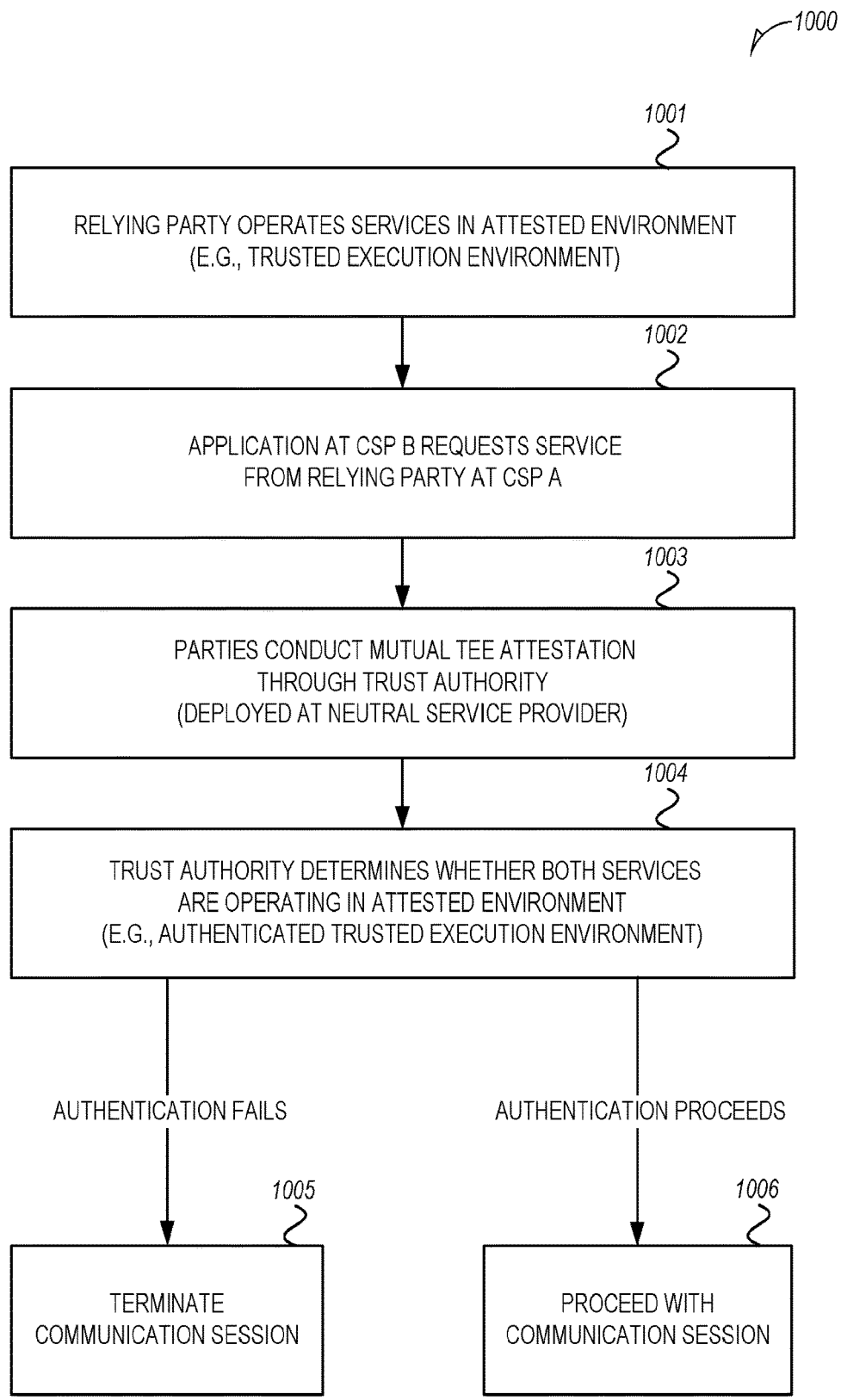
FIG. 10 illustrates a flowchart of attestation operations performed between two cloud service providers, according to an example.

FIG. 10 illustrates a flowchart 1000 of attestation operations performed between two cloud service providers, for establishing service communications.

At operation 1001, the relying party that provides services (e.g., the services running at CSP A) operates such services in a TEE. Here, the relying party attempts to ensure that the resources it provides are protected.

At operation 1002, the application running at CSP B attempts to request the service from the relying party deployed in CSP A.

At operation 1003, the parties perform mutual TEE attestation through the trust authority deployed in a neutral CSP/cloud.

At operation 1004, the trust authority identifies if both parties are both running in a TEE, and that trust can be verified for both TEEs. This verification is performed before allowing both parties to establish a connection (communication or communication session). In case either of the parties fails the attestation, the communication or communication session can be terminated (at operation 1005). If attestation succeeds for both parties, the secure communication or communication session can proceed between the parties (at operation 1006).

Figure 11:
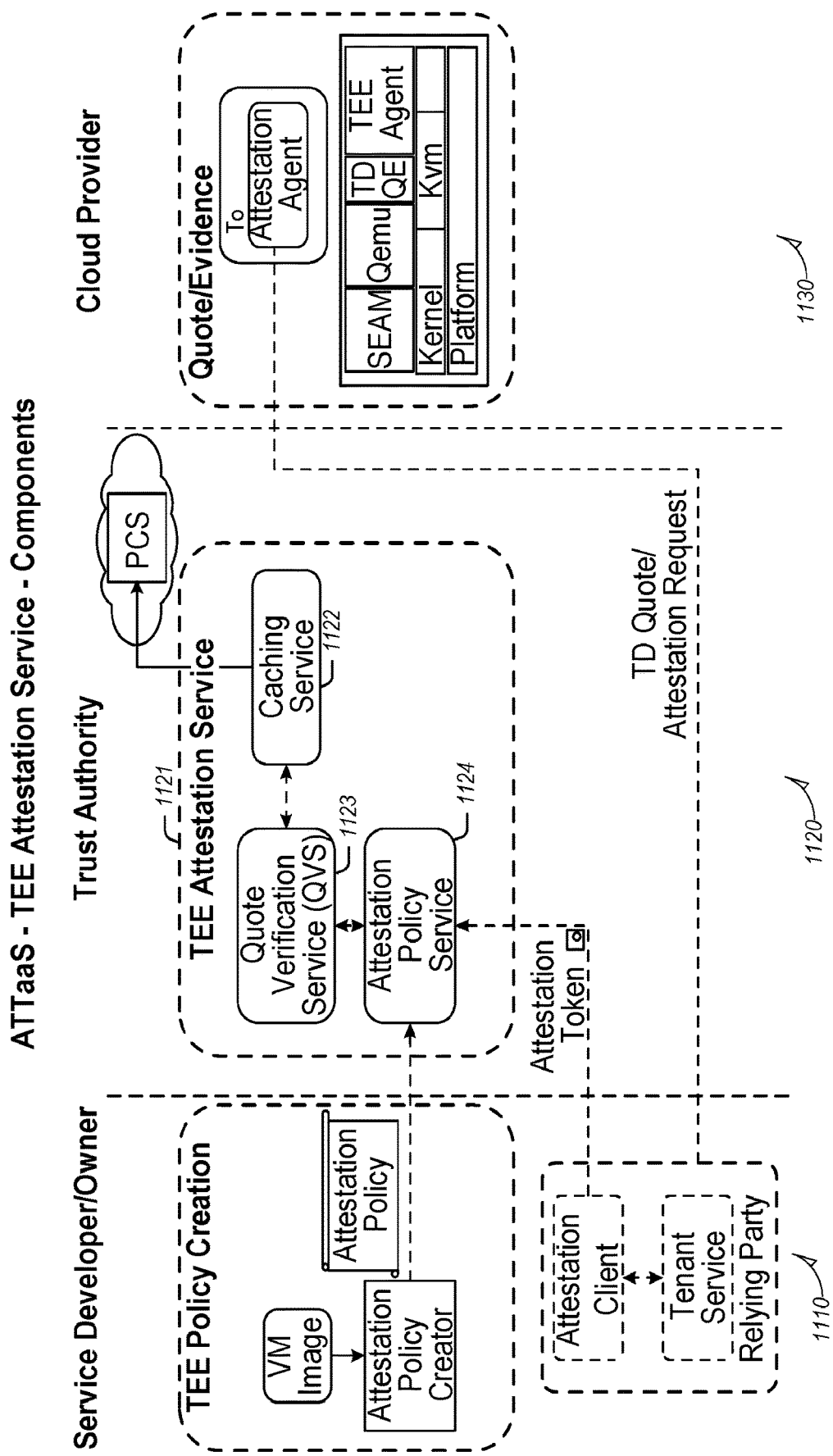
FIG. 11 illustrates components involved for Trusted Execution Environment attestation, according to an example.

FIG. 11 illustrates an example of further components involved for TEE attestation and its high-level flow. There are three sections illustrated vertically: components in section 1110 involve an owner of a service/application (e.g., tenants); components in section 1120 involve a trust authority; and components in section 1130 involve a CSP where the tenant workloads are running.

In an example, the TEE attestation service 1121 at the trust authority includes three microservices: a caching service 1122, quote verification service 1123, and attestation policy service 1124. The caching service 1122 caches platform certificates and its trusted computing base (TCB) information. The quote verification service 1123 verifies the quote (e.g., SGX quote or TD quote) that is provided by the running workloads when they are attested, against platform certificates and TCB info. The attestation policy service 1124 maintains the policy related to the workload and verifies the workload measurement included in the quote. The deployment of a trust authority is flexible and CSP independent, and thus may include additional or fewer microservices.

Figure 12:
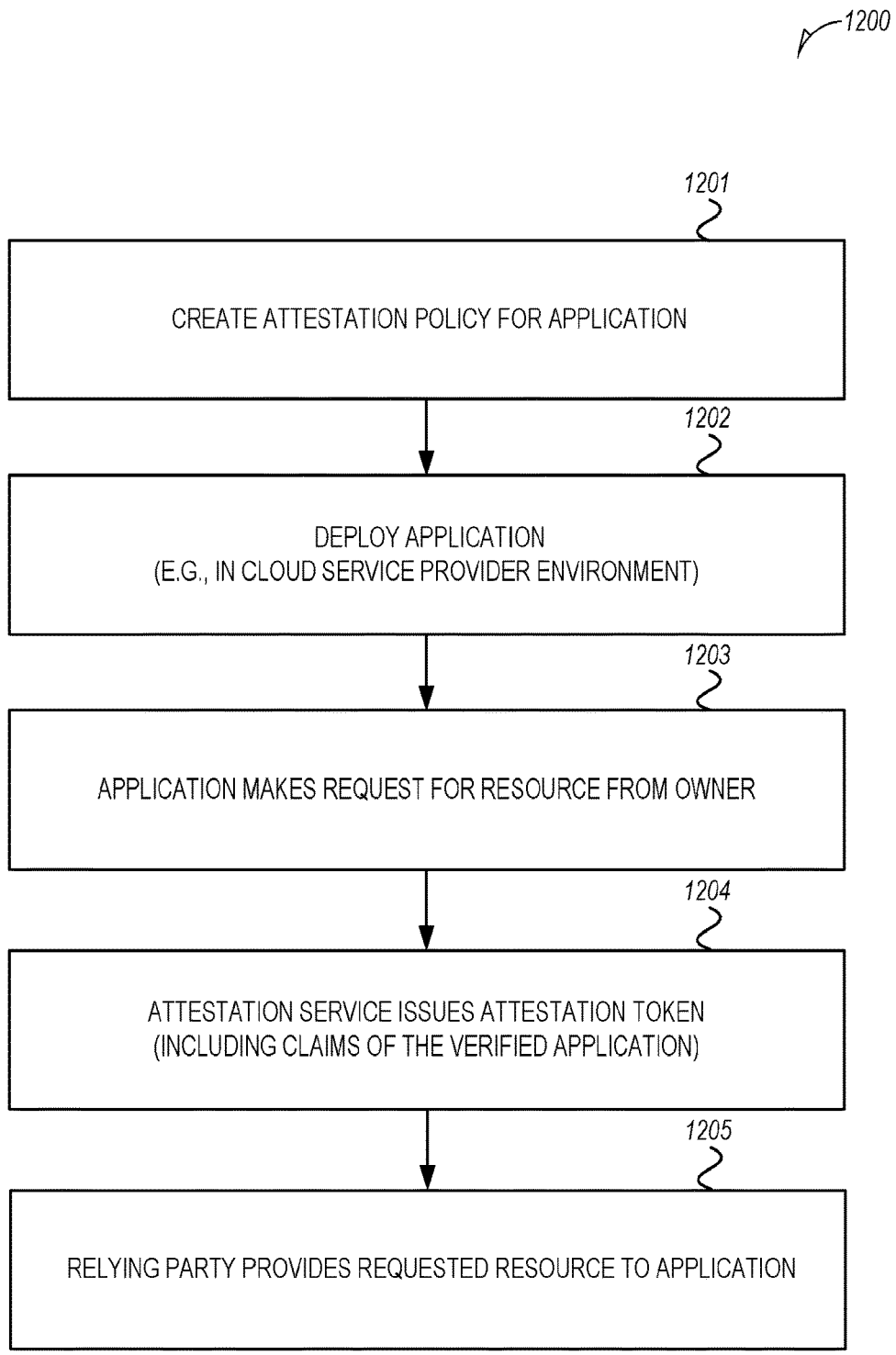
FIG. 12 illustrates a flowchart of further operations for Trusted Execution Environment attestation, according to an example.

FIG. 12 depicts a flowchart 1200 of further operations for attestation, using the approaches in FIG. 11. Here, this flowchart includes the following sequence:

At operation 1201: An application/service owner, before deploying an application in a CSP, creates (or establishes, activates, etc.) an attestation policy for the application. This may be accomplished with the TEE policy creation operations 1111 depicted in FIG. 11. The attestation policy defines the criteria used by the attestation service on how to validate/attest the application.

At operation 1202: The owner deploys the application at a CSP.

At operation 1203: The application in the cloud makes a request for a resource owned by the owner. This resource, however, must be attested by the attestation service 1121 in section 1120, before use or communications with the application.

At operation 1204: The attestation service 1121 successfully performs attestation, and issues an attestation token 1141 that includes claims of the verified application.

At operation 1205: The relying party decides to provide the requested resource to the application, based on the claims contained in the attestation token.

Implementing such SaaS-based attestation services, independent of CSPs, offers a beneficial option for the adoption and scaling of a variety of cloud native and microservice-based deployments. Enterprise application/services moving to cloud deployments has increased steadily year over year. This makes the application owners rely more and more on different CSPs, while also relying on SLAs and multiple providers to protect their workloads.

Although some large CSPs provide limited attestation features or services in their cloud, such features or services are limited to use within the CSP (e.g., based on TCB (trusted computing base) features). It will be understood that the use of a CSP-independent attestation service to verify an application/service may become a critical requirement to portability and interoperability. Further, the present implementation of a trust authority with its attestation service provides a unique approach to address the problem with existing deployments. This can help reduce or eliminate CSP dependency and lock-in, and enables improved security use cases.

As will be understood, providing a trust authority architecture with a SaaS-based system provides flexibility, isolation, and cloud native solution to meet tenant needs. Further, such architecture is extensible to accommodate more attestation beyond TEE attestation to add platform attestation, manifest management, and other features. In addition, it is also industry standard based and potentially drive more standardizations. Accordingly, a variety of adaptations may be enabled for a trust authority or ATTaaS instance beyond those directly discussed above.

Figure 13:
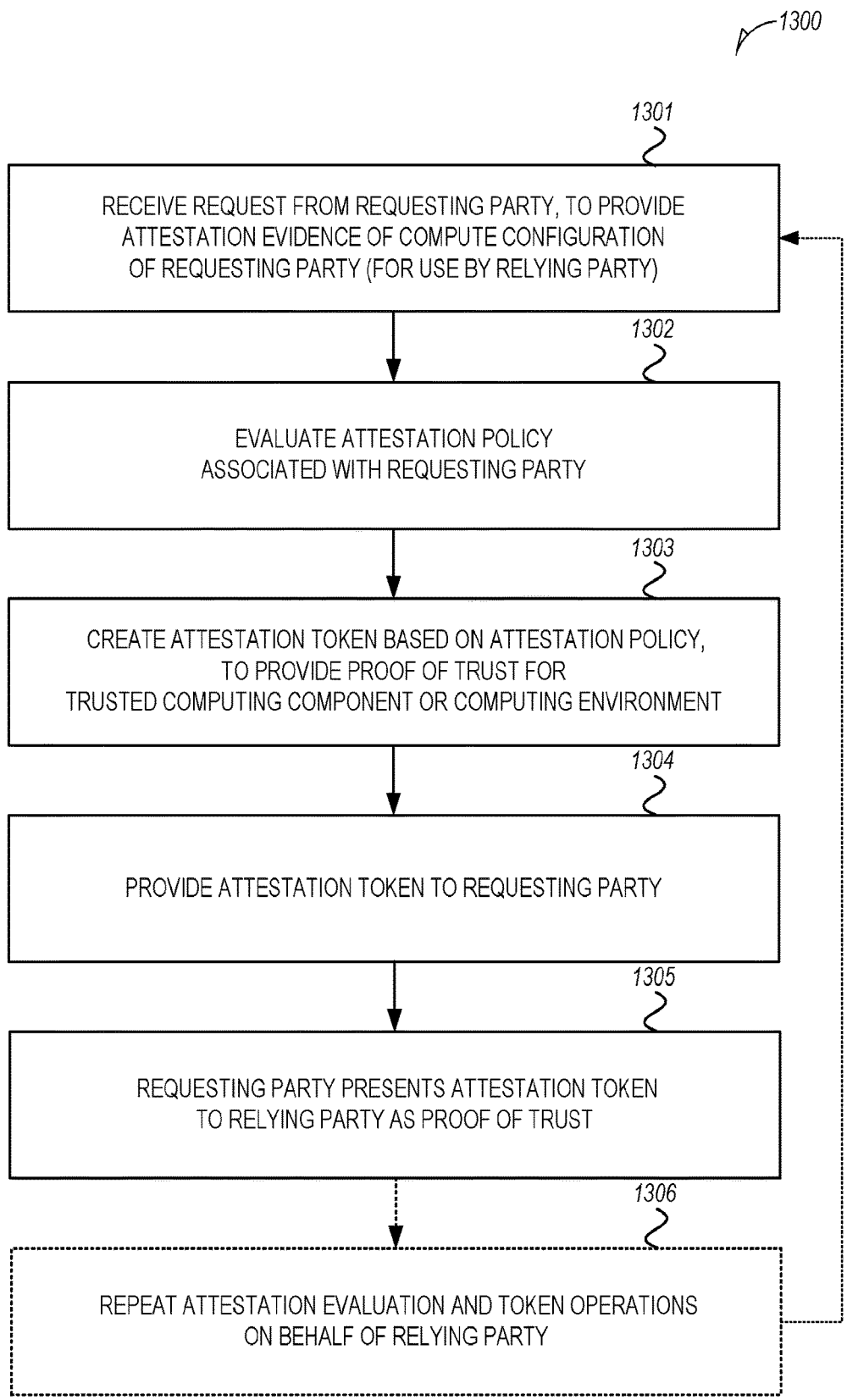
FIG. 13 illustrates a flowchart of a process for implementing and operating an attestation service, according to an example.

FIG. 13 is a flowchart 1300 that illustrates an example process for implementing and operating an attestation service. This flowchart 1300 is depicted from the perspective of a trust service provider, operating an attestation service (as discussed above). Consistent with the examples above, the operations of the flowchart 1300 may be performed by or orchestrated with an attestation service at the trust service provider, where the attestation service operates with one or more microservices. However, it will be understood that corresponding operations may also be performed at or coordinated with other entities including a "relying party" (a device or system or entity who wants proof of attestation, also can be referred to as a "relying device") and a "requesting party" (a device or system or entity who uses the attestation service to generate the proof of attestation, also can be referred to as a "requesting device").

At operation 1301, a request is received (at an attestation service operated by a trust service provider) from the requesting party, to obtain attestation evidence. This requested attestation evidence includes trust claims (or, "attestation claims") to serve as proof of trust of a compute configuration of the requesting party, to be evaluated by a relying party. In an example, the trust claims provided by the attestation evidence comprises data that indicates some property or properties (asset) of the target (the requesting party), to be reviewed by the appraiser (relying party), consistent with any number of trusted computing or attestation technology approaches. In an example, the requesting party is located in a first operational domain (e.g., first cloud service provider), the relying party is located in a second operational domain (e.g., second cloud service provider), and the trust service provider is located at a third operational domain (e.g., third cloud service provider). Also in an example, the request for attestation evidence is provided from the requesting party to the trust service provider, in response to an (earlier) request for some proof of trust that was provided from the relying party to the requesting party.

At operation 1302, the trust service provider obtains and evaluates an attestation policy associated with the requesting party (and optionally, the relying party). In an example, the attestation policy specifies one or more requirements for generating, evaluating, or providing the proof of attestation.

At operation 1303, the trust service provider creates an attestation token based on the attestation policy. This attestation token provides a proof of trust for the trust claims, to establish the trustworthiness of some asset (e.g., a trusted computing component, configuration, or environment). For example, proof of trust for the trust claims may be generated on behalf of a compute configuration of the requesting party, which relates to relates to use of a trusted execution environment at the requesting party.

At operation 1304, the attestation token is provided (e.g., communicated) to the requesting party, and at operation 1305, the requesting party provides (e.g., forwards) the attestation token to the relying party as a proof of trust. In an example, the relying party controls access to a resource based on verifying the trust claims from the token (serving as the proof of trust). In another example, the relying party controls access to a resource based on verifying the trust claims from the token (again, serving as the proof of trust).

At operation 1306, additional operations may be optionally performed to repeat the attestation evaluation and token generation operations, on behalf of a relying party (with the roles of the relying and requesting parties being reversed). This can allow additional attestation evidence providing additional trust claims for the originally relying party to be evaluated by the originally requesting party, to enable the two parties to perform mutual attestation with each other. Additional operations, not depicted, may be performed based on this mutual attestation.

Example Edge Computing Architectures

Although the previous discussion was provided with reference to specific networked compute deployments, it will be understood that the TaaS instances may be implemented at any number of devices that access services from the "cloud", devices that access services from the "edge cloud", or devices that access services from the "data center cloud". In particular, for edge devices to successfully access any services in the edge cloud, the edge device has to be attested as secure.

Accordingly, the present techniques provide a framework to enable attestation of the security portion of the edge before services are fulfilled at the edge. Further, the present techniques provide a continuum of verification, from data center to cloud to edge.

Figure 14:
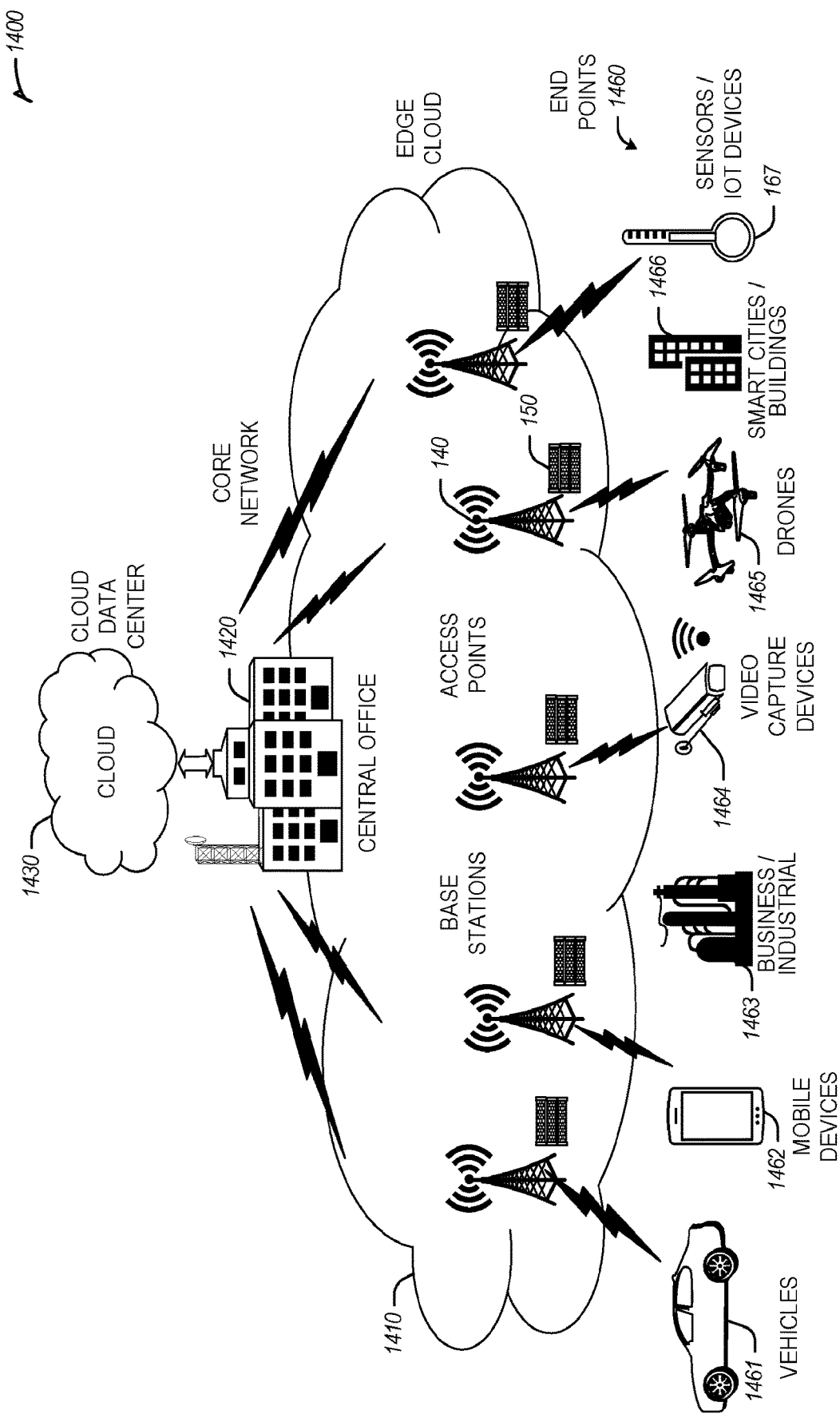
FIG. 14 illustrates an overview of an edge cloud configuration for edge computing, according to an example.

FIG. 14 is a block diagram 1400 showing an overview of a configuration for edge computing, which includes a layer of processing referenced in many of the current examples as an "edge cloud". As shown, the edge cloud 1410 is co-located at an edge location, such as an access point or base station 1440, a local processing hub 1450, or a central office 1420, and thus may include multiple entities, devices, and equipment instances. The edge cloud 1410 is located much closer to the endpoint (consumer and producer) data sources 1460 (e.g., autonomous vehicles 1461, user equipment 1462, business and industrial equipment 1463, video capture devices 1464, drones 1465, smart cities and building devices 1466, sensors and IoT devices 1467, etc.) than the cloud data center 1430. Compute, memory, and storage resources which are offered at the edges in the edge cloud 1410 are critical to providing ultra-low latency response times for services and functions used by the endpoint data sources 1460 as well as reduce network backhaul traffic from the edge cloud 1410 toward cloud data center 1430 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86, AMD or ARM hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 14, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application-Layer data is typically less time-critical and may be stored and processed in a remote cloud data-center.

Figure 15:
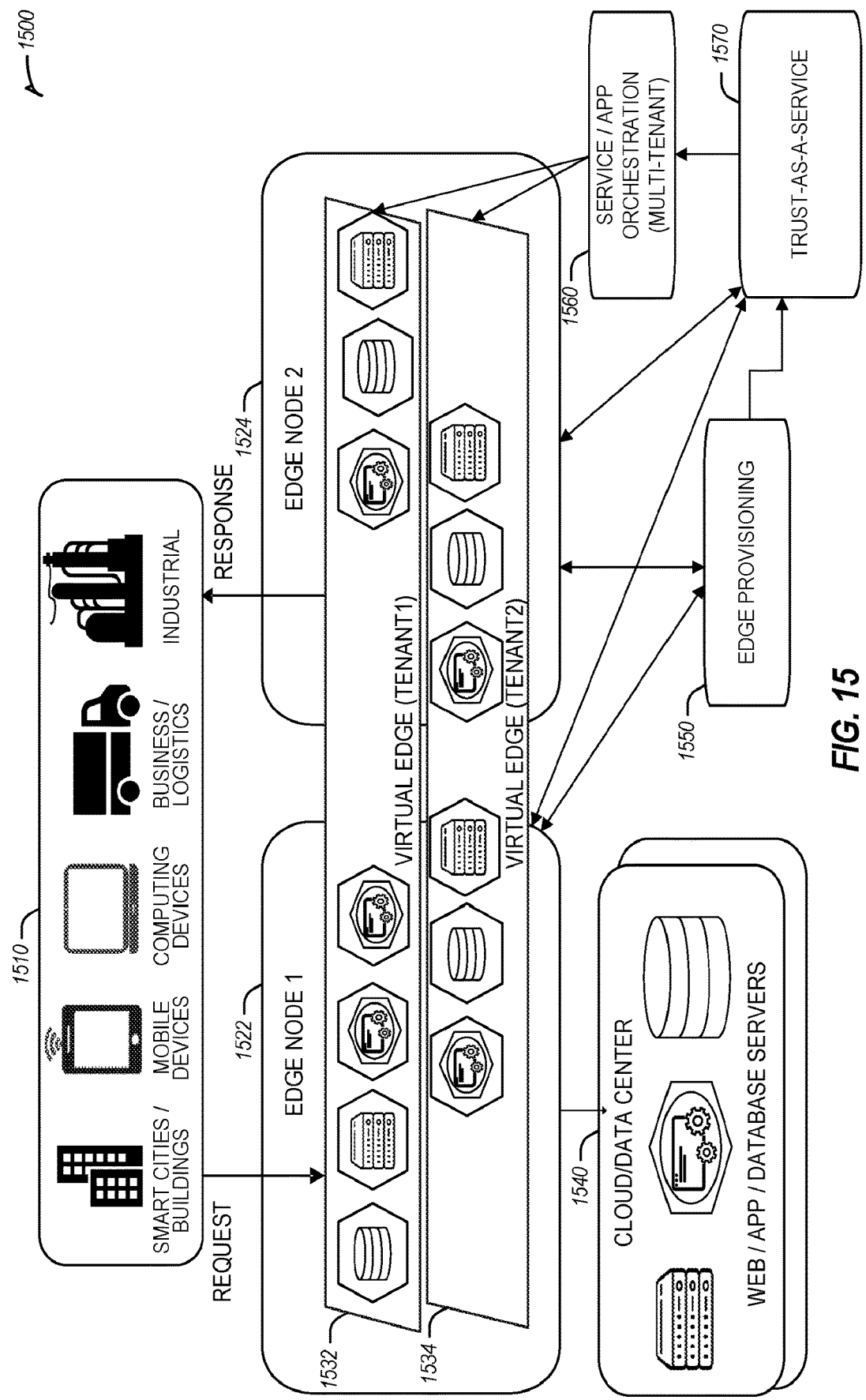
FIG. 15 illustrates deployment and orchestration for virtual edge configurations across an edge-computing system operated among multiple edge nodes and multiple tenants, according to an example.

FIG. 15 illustrates deployment and orchestration for virtual edge configurations across an edge computing system operated among multiple edge nodes and multiple tenants. Specifically, FIG. 15 depicts coordination of a first edge node 1522 and a second edge node 1524 in an edge computing system 1500, to fulfill requests and responses for various client endpoints 1510 (e.g., smart cities/building systems, mobile devices, computing devices, business/logistics systems, industrial systems, etc.), which access various virtual edge instances. The virtual edge instances 232, 234 (or virtual edges) provide edge compute capabilities and processing in an edge cloud, with access to a cloud/data center 1540 for higher-latency requests for websites, applications, database servers, etc. Thus, the edge cloud enables coordination of processing among multiple edge nodes for multiple tenants or entities.

In the example of FIG. 15, these virtual edge instances include a first virtual edge 1532, offered to a first tenant (Tenant 1), which offers a first combination of edge storage, computing, and services; and a second virtual edge 1534, offering a second combination of edge storage, computing, and services, to a second tenant (Tenant 2). The virtual edge instances 1532, 1534 are distributed among the edge nodes 1522, 1524, and may include scenarios in which a request and response are fulfilled from the same or different edge nodes. The configuration of each edge node 1522, 1524 to operate in a distributed yet coordinated fashion occurs based on edge provisioning functions 1550. The functionality of the edge nodes 1522, 1524 to provide coordinated operation for applications and services, among multiple tenants, occurs based on orchestration functions 1560.

It should be understood that some of the devices in 1510 are multi-tenant devices where Tenant1 may function within a Tenant1 'slice' while a Tenant2 may function within a Tenant2 'slice' (and, in further examples, additional or sub-tenants may exist; and each tenant may even be specifically entitled and transactionally tied to a specific set of features all the way to specific hardware features). A trusted multi-tenant device may further contain a tenant-specific cryptographic key such that the combination of a key and a slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning devices in 1510, 1522, and 1540 may coordinate the establishment of a distributed trusted computing base (DTCB) such that a tenant-specific virtual trusted secure channel linking all elements end-to-end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

As an example, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 15. An orchestrator may use a DICE layering and fan-out construction to create a root of trust context that is tenant specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations (or, respective computing systems and resources which are co-owned or co-managed by multiple owners).

For instance, each edge node 1522, 1524 may implement the use of containers, such as with the use of a container "pod" 1526, 1528 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 1532, 1534 are partitioned according to the needs of each container.

With the use of container pods, a pod controller oversees the partitioning and allocation of containers and resources. The pod controller receives instructions from an orchestrator (e.g., performing orchestration functions 1560) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there may be a shared pod controller that consolidates resource allocation requests to avoid typical resource starvation situations. Further controls may be provided to ensure the attestation and trustworthiness of the pod and pod controller. For instance, the orchestrator 1560 may provision an attestation verification policy to local pod controllers that perform attestation verification. If an attestation satisfies a policy for a first tenant pod controller but not a second tenant pod controller, then the second pod may be migrated to a different edge node that does satisfy it. Alternatively, the first pod may be allowed to execute and a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside from the execution of virtualized network functions).

Within the edge cloud, a first edge node 1522 (e.g., operated by a first owner) and a second edge node 1524 (e.g., operated by a second owner) may operate or respond to a container orchestrator to coordinate the execution of various applications within the virtual edge instances offered for respective tenants. For instance, the edge nodes 1522, 1524 may be coordinated based on edge provisioning functions 1550, while the operation of the various applications is coordinated with orchestration functions 1560.

Various system arrangements may provide an architecture that treats VMs, Containers, and Functions equally in terms of application composition (and resulting applications are combinations of these three ingredients). Each ingredient may involve the use of one or more accelerator (e.g., FPGA, ASIC) components as a local backend. In this manner, applications can be split across multiple edge owners, coordinated by an orchestrator.

Figure 16:
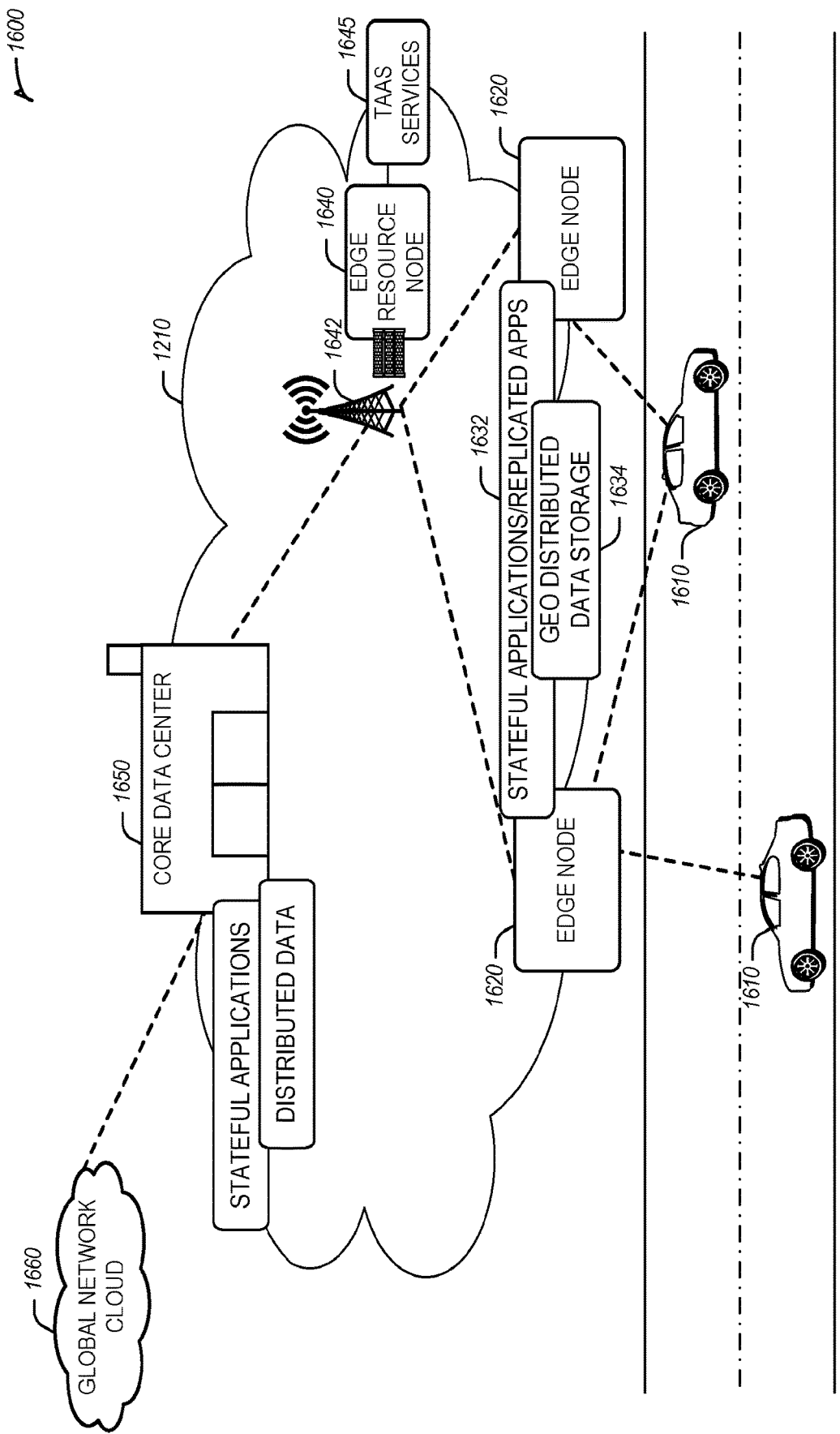
FIG. 16 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 16 shows a simplified vehicle compute and communication use case involving mobile access to applications in an edge computing system 1600 that implements an edge cloud 1410 connected to Trust-as-a-service instances 1645. In this use case, each client compute node 1610 may be embodied as in-vehicle compute systems (e.g., in-vehicle navigation and/or infotainment systems) located in corresponding vehicles that communicate with the edge gateway nodes 1620 during traversal of a roadway. For instance, edge gateway nodes 1620 may be located in roadside cabinets, which may be placed along the roadway, at intersections of the roadway, or other locations near the roadway. As each vehicle traverses along the roadway, the connection between its client compute node 1610 and a particular edge gateway node 1620 may propagate to maintain a consistent connection and context for the client compute node 1610. Each of the edge gateway nodes 1620 includes some processing and storage capabilities and, as such, some processing and/or storage of data for the client compute nodes 1610 may be performed on one or more of the edge gateway nodes 1620.

Each of the edge gateway nodes 1620 may communicate with one or more edge resource nodes 1640, which are illustratively embodied as compute servers, appliances or components located at or in a communication base station 1642 (e.g., a base station of a cellular network). As discussed above, each edge resource node 1640 includes some processing and storage capabilities, and, as such, some processing and/or storage of data for the client compute nodes 1610 may be performed on the edge resource node 1640. For example, the processing of data that is less urgent or important may be performed by the edge resource node 1640, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 1620, edge resource node(s) 340, core data center 1650, and network cloud 1660.

The edge resource node(s) 1640 also communicate with the core data center 1650, which may include compute servers, appliances, and/or other components located in a central location (e.g., a central office of a cellular communication network). The core data center 1650 may provide a gateway to the global network cloud 1660 (e.g., the Internet) for the edge cloud 1410 operations formed by the edge resource node(s) 1640 and the edge gateway nodes 1620. Additionally, in some examples, the core data center 1650 may include an amount of processing and storage capabilities and, as such, some processing and/or storage of data for the client compute devices may be performed on the core data center 1650 (e.g., processing of low urgency or importance, or high complexity). The edge gateway nodes 1620 or the edge resource nodes 1640 may offer the use of stateful applications 1632 and a geographically distributed data storage 1634 (e.g., database, data store, etc.).

In further examples, FIG. 16 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 1620, some others at the edge resource node 1640, and others in the core data center 1650 or the global network cloud 1660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 17:
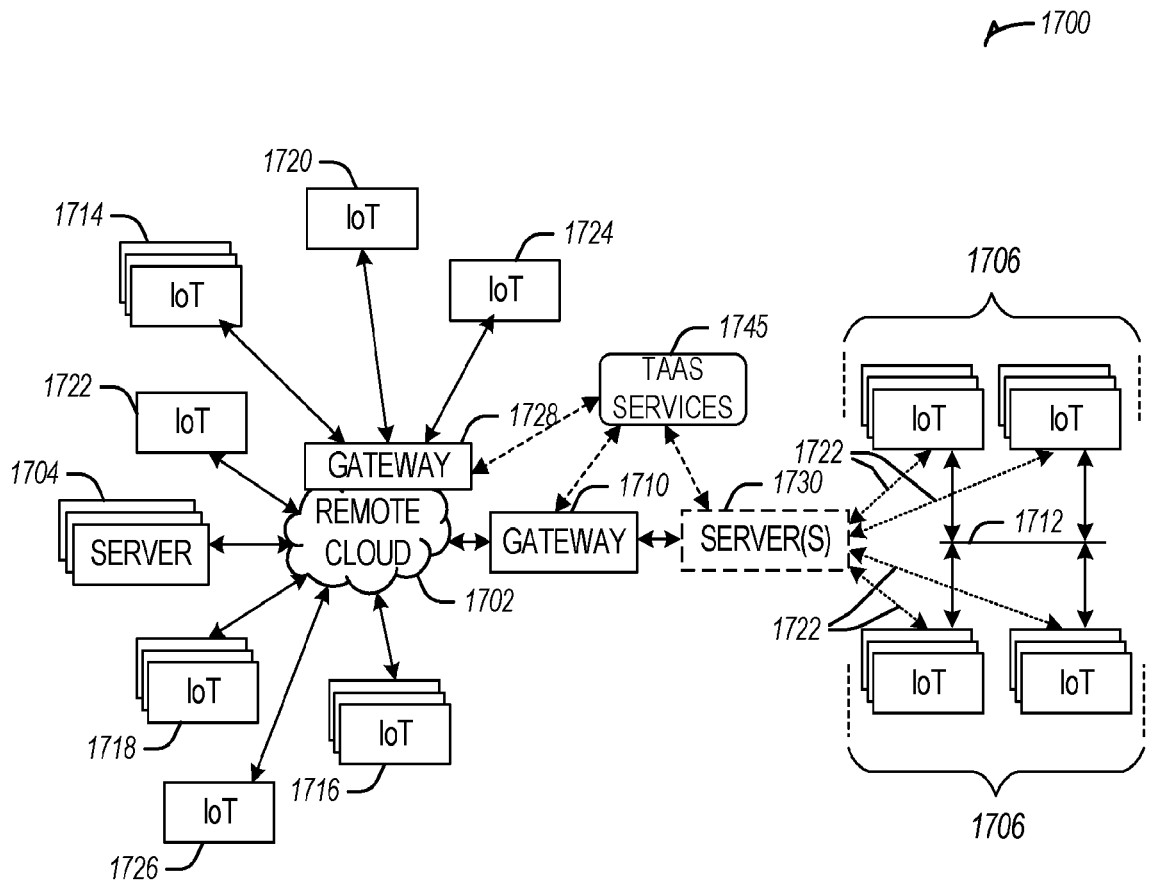
FIG. 17 illustrates a block diagram depicting deployment and communications among several Internet of Things (IoT) devices, according to an example.

As a more detailed illustration of an Internet of Things (IoT) network, FIG. 17 illustrates a drawing of a cloud or edge computing network 1700, in communication with several IoT devices and a TaaS instance 1745. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or PC, or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 17, the network 1700 may represent portions of the Internet or may include portions of a local area network (LAN), or a wide area network (WAN), such as a proprietary network for a company. The IoT devices may include any number of different types of devices, grouped in various combinations. For example, a traffic control group 1706 may include IoT devices along streets in a city. These IoT devices may include stoplights, traffic flow monitors, cameras, weather sensors, and the like. The traffic control group 406, or other subgroups, may be in communication within the network 1700 through wired or wireless links 1708, such as LPWA links, optical links, and the like. Further, a wired or wireless sub-network 1712 may allow the IoT devices to communicate with each other, such as through a local area network, a wireless local area network, and the like. The IoT devices may use another device, such as a gateway 1710 or 1728 to communicate with remote locations such as remote cloud 1702; the IoT devices may also use one or more servers 1730 to facilitate communication within the network 1700 or with the gateway 1710. For example, the one or more servers 1730 may operate as an intermediate network node to support a local edge cloud or fog implementation among a local area network. Further, the gateway 1728 that is depicted may operate in a cloud-to-gateway-to-many edge devices configuration, such as with the various IoT devices 1714, 1720, 1724 being constrained or dynamic to an assignment and use of resources in the network 1700.

In an example embodiment, the network 1700 can further include or be communicatively coupled to an Trust-a-a-Service instance or deployment configured to perform trust attestation operations within the network 1700, such as that discussed above.

Other example groups of IoT devices may include remote weather stations 1714, local information terminals 1716, alarm systems 1718, automated teller machines 1720, alarm panels 1722, or moving vehicles, such as emergency vehicles 1724 or other vehicles 1726, among many others. Each of these IoT devices may be in communication with other IoT devices, with servers 1704, with another IoT device or system, another edge computing or "fog" computing system, or a combination therein. The groups of IoT devices may be deployed in various residential, commercial, and industrial settings (including in both private or public environments).

As may be seen from FIG. 17, a large number of IoT devices may be communicating through the network 1700. This may allow different IoT devices to request or provide information to other devices autonomously. For example, a group of IoT devices (e.g., the traffic control group 1706) may request a current weather forecast from a group of remote weather stations 1714, which may provide the forecast without human intervention. Further, an emergency vehicle 1724 may be alerted by an automated teller machine 1720 that a burglary is in progress. As the emergency vehicle 1724 proceeds towards the automated teller machine 1720, it may access the traffic control group 1706 to request clearance to the location, for example, by lights turning red to block cross traffic at an intersection in sufficient time for the emergency vehicle 1724 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 1714 or the traffic control group 1706, may be equipped to communicate with other IoT devices as well as with the network 1700. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/de-MUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide-area (LPWA) network, for example, a LPWA network compatible with the LoRaWan specification promulgated by the LoRa alliance, or an IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, a LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance, and deliver a metric of data confidence.

Example Computing Devices

Figure 18:
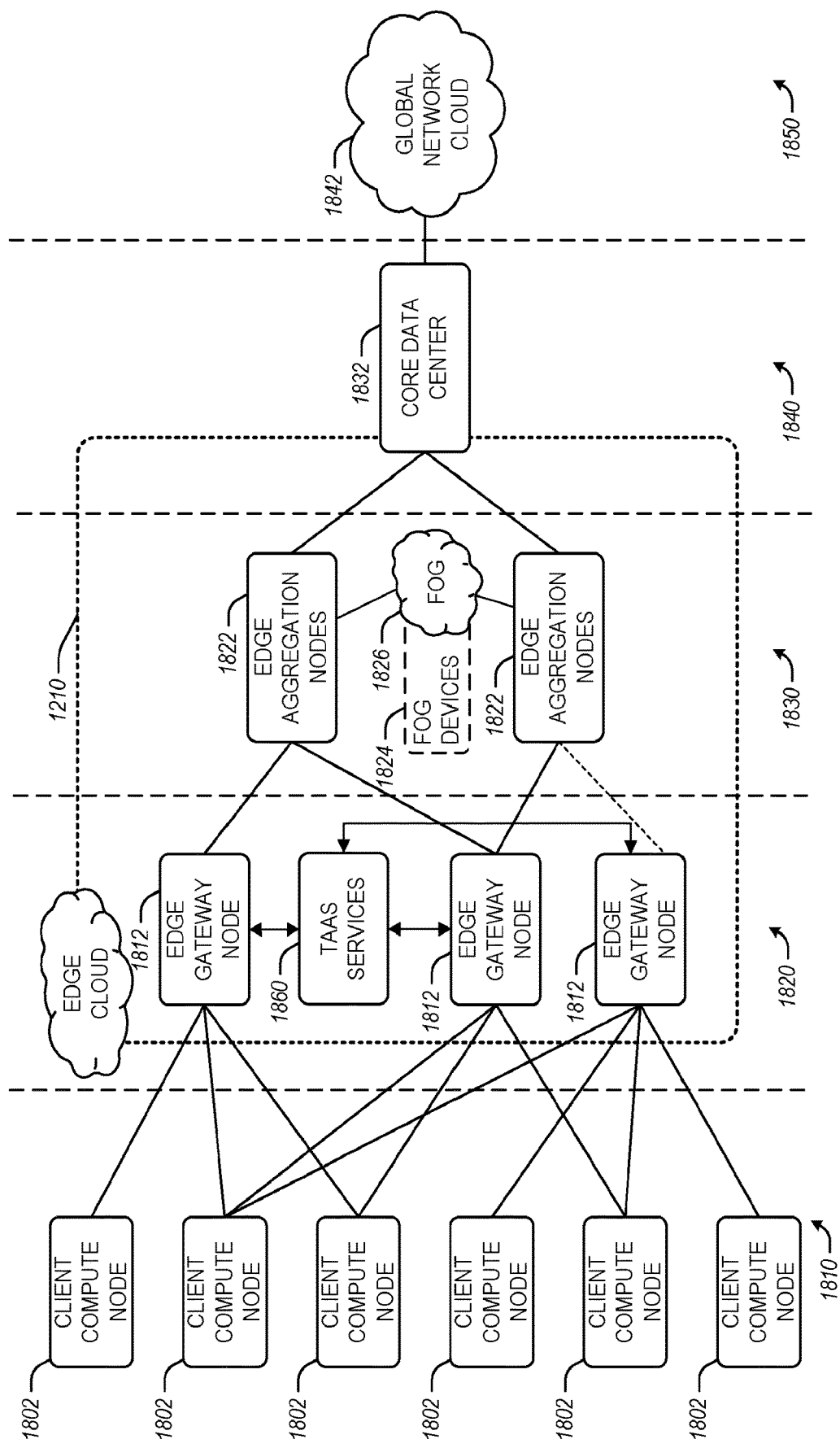
FIG. 18 illustrates an overview of layers of distributed compute deployed among an edge computing system, according to an example.

At a more generic level, an edge computing system may be described to encompass any number of deployments operating in the edge cloud 1410, which provide coordination from client and distributed computing devices. FIG. 18 provides a further abstracted overview of layers of distributed compute deployed among an edge computing environment for purposes of illustration.

FIG. 18 generically depicts an edge computing system for providing edge services and applications to multi-stakeholder entities, as distributed among one or more client compute nodes 1802, one or more edge gateway nodes 1812, one or more edge aggregation nodes 1822, one or more core data centers 1832, and a global network cloud 1842, as distributed across layers of the network. The implementation of the edge computing system may be provided at or on behalf of a telecommunication service provider ("telco", or "TSP"), internet-of-things service provider, a cloud service provider (CSP), enterprise entity, or any other number of entities. Various forms of wired or wireless connections may be configured to establish connectivity among the nodes 1802, 1812, 1822, 1832, including interconnections among such nodes (e.g., connections among edge gateway nodes 1812, and connections among edge aggregation nodes 1822). Such connectivity and federation of these nodes may be assisted with the use of TaaS services 2560 and service instances, as discussed herein.

Each node or device of the edge computing system is located at a particular layer corresponding to layers 1810, 1820, 1830, 1840, and 1850. For example, the client compute nodes 1802 are each located at an endpoint layer 1810, while each of the edge gateway nodes 1812 is located at an edge devices layer 1820 (local level) of the edge computing system. Additionally, each of the edge aggregation nodes 1822 (and/or fog devices 1824, if arranged or operated with or among a fog networking configuration 1826) is located at a network access layer 1830 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of a fog may be integrated into an edge computing architecture.

The core data center 1832 is located at a core network layer 1840 (e.g., a regional or geographically-central level), while the global network cloud 1842 is located at a cloud data center layer 1850 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1832 may be located within, at, or near the edge cloud 1410.

Although an illustrative number of client compute nodes 1802, edge gateway nodes 1812, edge aggregation nodes 1822, core data centers 1832, and global network clouds 1842 are shown in FIG. 18, it should be appreciated that the edge computing system may include more or fewer devices or systems at each layer. Additionally, as shown in FIG. 18, the number of components of each layer 1810, 1820, 1830, 1840, and 1850 generally increases at each lower level (i.e., when moving closer to endpoints). As such, one edge gateway node 1812 may service multiple client compute nodes 1802, and one edge aggregation node 1822 may service multiple edge gateway nodes 1812.

Consistent with the examples provided herein, each client compute node 1802 may be embodied as any type of end point component, device, appliance, or "thing" capable of communicating as a producer or consumer of data. Further, the label "node" or "device" as used in the edge computing system 1800 does not necessarily mean that such node or device operates in a client or minion/follower/agent role; rather, any of the nodes or devices in the edge computing system 1800 refer to individual entities, nodes, or subsystems which include discrete or connected hardware or software configurations to facilitate or use the edge cloud 1410.

As such, the edge cloud 1410 is formed from network components and functional features operated by and within the edge gateway nodes 1812 and the edge aggregation nodes 1822 of layers 1820, 1830, respectively. The edge cloud 1410 may be embodied as any type of network that provides edge computing and/or storage resources which are proximately located to radio access network (RAN) capable endpoint devices (e.g., mobile computing devices, IoT devices, smart devices, etc.), which are shown in FIG. 18 as the client compute nodes 1802. In other words, the edge cloud 1410 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1410 may form a portion of or otherwise provide an ingress point into or across a fog networking configuration 1826 (e.g., a network of fog devices 1824, not shown in detail), which may be embodied as a system-level horizontal and distributed architecture that distributes resources and services to perform a specific function. For instance, a coordinated and distributed network of fog devices 1824 may perform computing, storage, control, or networking aspects in the context of an IoT system arrangement. Other networked, aggregated, and distributed functions may exist in the edge cloud 1410 between the cloud data center layer 1850 and the client endpoints (e.g., client compute nodes 1802). Some of these are discussed in the following sections in the context of network functions or service virtualization, including the use of virtual edges and virtual services which are orchestrated for multiple stakeholders.

The edge gateway nodes 1812 and the edge aggregation nodes 1822 cooperate to provide various edge services and security to the client compute nodes 1802. Furthermore, because each client compute node 1802 may be stationary or mobile, each edge gateway node 1812 may cooperate with other edge gateway devices to propagate presently provided edge services and security as the corresponding client compute node 1802 moves about a region. To do so, each of the edge gateway nodes 1812 and/or edge aggregation nodes 1822 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 19 and 20. Each edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other devices or systems capable of performing the described functions.

Figure 19:
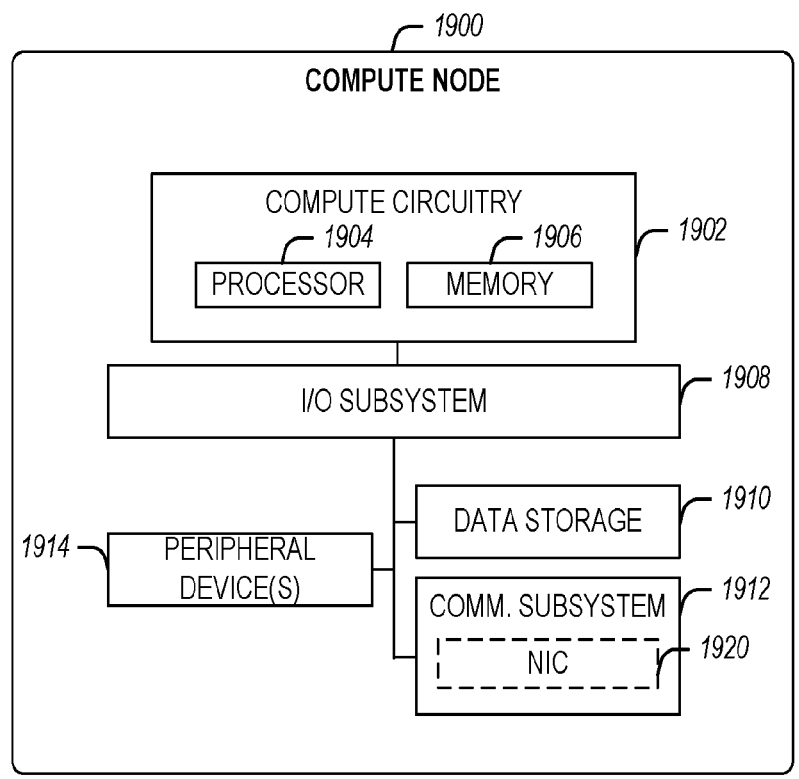
FIG. 19 illustrates an overview of example components deployed at a compute node system, according to an example.

In the simplified example depicted in FIG. 19, an edge compute node 1900 includes a compute engine (also referred to herein as "compute circuitry") 1902, an input/output (I/O) subsystem 1908, data storage 1910, a communication circuitry subsystem 1912, and, optionally, one or more peripheral devices 1914. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1900 may be embodied as any type of engine, device, or collection of devices capable of performing various compute functions. In some examples, the compute node 1900 may be embodied as a single device such as an integrated circuit, an embedded system, a field-programmable gate array (FPGA), a system-on-a-chip (SOC), or other integrated system or device. In the illustrative example, the compute node 1900 includes or is embodied as a processor 1904 and a memory 1906. The processor 1904 may be embodied as any type of processor capable of performing the functions described herein (e.g., executing an application). For example, the processor 1904 may be embodied as a multi-core processor(s), a microcontroller, a processing unit, a specialized or special purpose processing unit, or other processor or processing/controlling circuit. In some examples, the processor 1904 may be embodied as, include, or be coupled to an FPGA, an application-specific integrated circuit (ASIC), reconfigurable hardware or hardware circuitry, or other specialized hardware to facilitate performance of the functions described herein. Also in some examples, the processor 1904 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, a SOC, a CPU, and other variations of the processor 1904 may work in coordination with each other to execute many types of operations and instructions within and on behalf of the compute node 1900.

The main memory 1906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1906 may be integrated into the processor 1904. The main memory 1906 may store various software and data used during operation such as one or more applications, data operated on by the application(s), libraries, and drivers.

The compute circuitry 1902 is communicatively coupled to other components of the compute node 1900 via the I/O subsystem 1908, which may be embodied as circuitry and/or components to facilitate input/output operations with the compute circuitry 1902 (e.g., with the processor 1904 and/or the main memory 1906) and other components of the compute circuitry 1902. For example, the I/O subsystem 1908 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1908 may form a portion of a system-on-a-chip (SoC) and be incorporated, along with one or more of the processor 1904, the main memory 1906, and other components of the compute circuitry 1902, into the compute circuitry 1902.

The one or more illustrative data storage devices 1910 may be embodied as any type of device configured for short-term or long-term storage of data such as, for example, memory devices and circuits, memory cards, hard disk drives, solid-state drives, or other data storage devices. Each data storage device 1910 may include a system partition that stores data and firmware code for the data storage device 1910. Each data storage device 1910 may also include one or more operating system partitions that store data files and executables for operating systems depending on, for example, the type of compute node 1900.

The communication circuitry 1912 may be embodied as any communication circuit, device, or collection thereof, capable of enabling communications over a network between the compute circuitry 1902 and another compute device (e.g., an edge gateway node 1812 of the edge computing system 1800). The communication circuitry 1912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 1912 includes a network interface controller (NIC) 1920, which may also be referred to as a host fabric interface (HFI). The NIC 1920 may be embodied as one or more add-in-boards, daughter cards, network interface cards, controller chips, chipsets, or other devices that may be used by the compute node 1900 to connect with another compute device (e.g., an edge gateway node 1812). In some examples, the NIC 1920 may be embodied as part of a system-on-a-chip (SoC) that includes one or more processors or included on a multichip package that also contains one or more processors. In some examples, the NIC 1920 may include a local processor (not shown) and/or a local memory and storage (not shown) that are local to the NIC 1920. In such examples, the local processor of the NIC 1920 (which can include general-purpose accelerators or specific accelerators) may be capable of performing one or more of the functions of the compute circuitry 1902 described herein. Additionally, or alternatively, the local memory of the NIC 1920 may be integrated into one or more components of the client compute node at the board level, socket level, chip level, and/or other levels.

Additionally, in some examples, each compute node 1900 may include one or more peripheral devices 1914. Such peripheral devices 1914 may include any type of peripheral device found in a compute device or server such as audio input devices, a display, other input/output devices, interface devices, and/or other peripheral devices, depending on the particular type of the compute node 1900. In further examples, the compute node 1900 may be embodied by a respective edge compute node in an edge computing system (e.g., client compute node 1802, edge gateway node 1812, edge aggregation node 1822) or like forms of appliances, computers, subsystems, circuitry, or other components.

Figure 20:
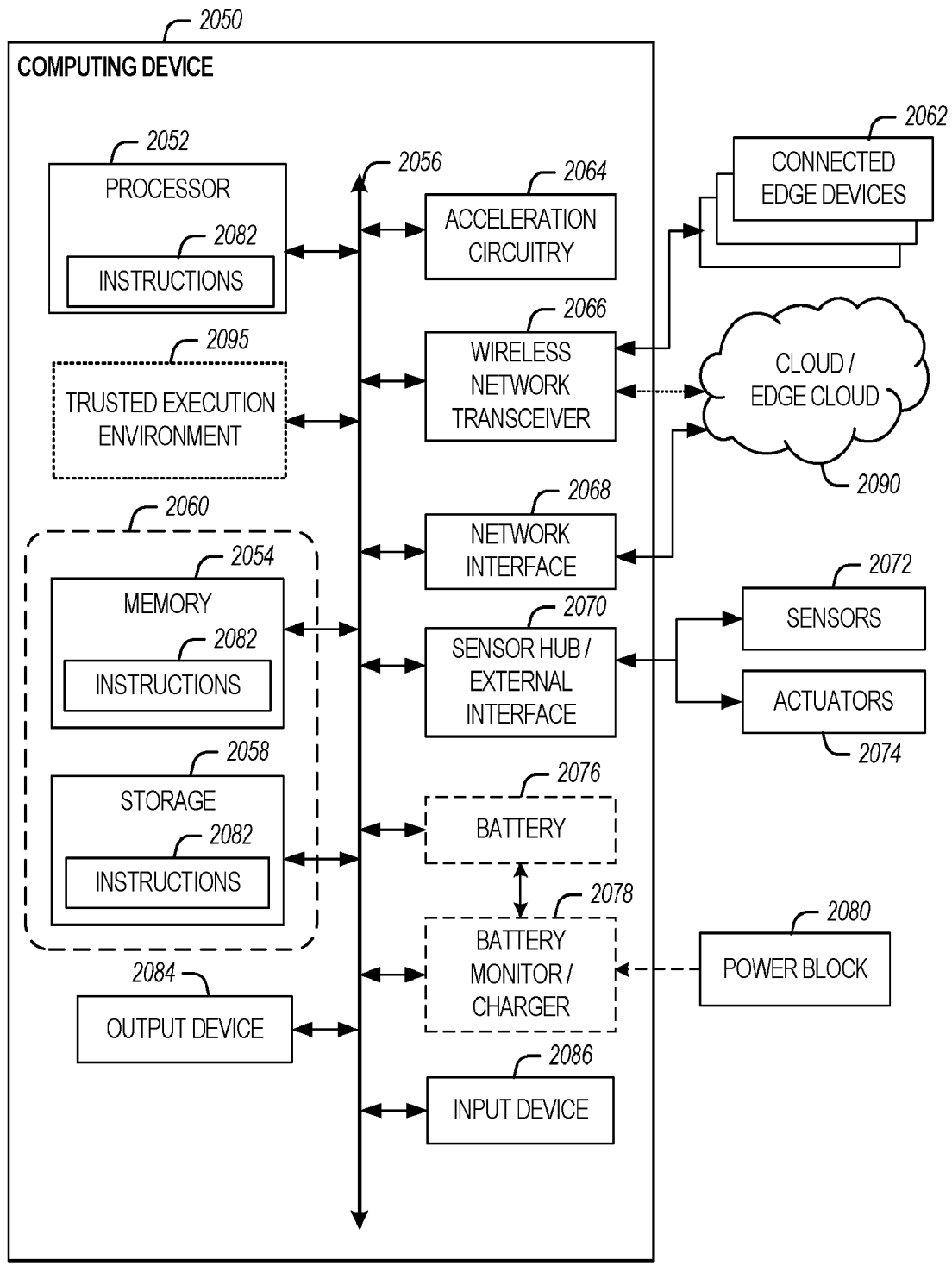
FIG. 20 illustrates a further overview of example components within a computing device, according to an example.

In a more detailed example, FIG. 20 illustrates a block diagram of an example of components that may be present in an edge computing device (or node) 2050 for implementing the techniques (e.g., operations, processes, methods, and methodologies) described herein. The edge computing node 2050 provides a closer view of the respective components of node 1900 when implemented as or as part of a computing device (e.g., as a mobile device, a base station, server, gateway, etc.). The edge computing node 2050 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 2050, or as components otherwise incorporated within a chassis of a larger system.

The edge computing node 2050 may include processing circuitry in the form of a processor 2052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 2052 may be a part of a system on a chip (SoC) in which the processor 2052 and other components are formed into a single integrated circuit, or a single package, such as the Edison™ or Galileo™ SoC boards from Intel Corporation, Santa Clara, California. As an example, the processor 2052 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc. The processor 2052 and accompanying circuitry may be provided in a single socket form factor, multiple socket form factor, or a variety of other formats, including in limited hardware configurations or configurations that include fewer than all elements shown in FIG. 20.

The processor 2052 may communicate with a system memory 2054 over an interconnect 2056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 2058 may also couple to the processor 2052 via the interconnect 2056. In an example, the storage 2058 may be implemented via a solid-state disk drive (SSDD). Other devices that may be used for the storage 2058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 2058 may be on-die memory or registers associated with the processor 2052. However, in some examples, the storage 2058 may be implemented using a micro hard disk drive (HDD) or solid-state drive (SSD). Further, any number of new technologies may be used for the storage 2058 in addition to, or instead of, the technologies described, such resistance change memories, phase change memories, holographic memories, or chemical memories, among others.

The components may communicate over the interconnect 2056. The interconnect 2056 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 2056 may be a proprietary bus, for example, used in an SoC based system. Other bus systems may be included, such as an I2C interface, an SPI interface, point to point interfaces, and a power bus, among others.

The interconnect 2056 may couple the processor 2052 to a transceiver 2066, for communications with the connected edge devices 2062. The transceiver 2066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2066 (or multiple transceivers) may communicate using multiple standards or radios for communications at a different range. For example, the edge computing node 2050 may communicate with close devices, e.g., within about 10 meters, using a local transceiver based on BLE, or another low power radio, to save power. More distant connected edge devices 2062, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee®.

A wireless network transceiver 2066 (e.g., a radio transceiver) may be included to communicate with devices or services in the edge cloud 2090 via local or wide area network protocols. The wireless network transceiver 2066 may be an LPWA transceiver that follows the IEEE 802.15.4, or IEEE 802.15.4g standards, among others. The edge computing node 2050 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2066, as described herein. For example, the transceiver 2066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2068 may be included to provide a wired communication to nodes of the edge cloud 2090 or other devices, such as the connected edge devices 2062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 2068 may be included to enable connecting to a second network, for example, a first NIC 2068 providing communications to the cloud over Ethernet, and a second NIC 2068 providing communications to other devices over another type of network.

Given the variety of types of applicable communications from the device to another component or network, applicable communications circuitry used by the device may include or be embodied by any one or more of components 2064, 2066, 2068, or 2070. Accordingly, in various examples, applicable means for communicating (e.g., receiving, transmitting, etc.) may be embodied by such communications circuitry.

The edge computing node 2050 may include or be coupled to acceleration circuitry 2064, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 2056 may couple the processor 2052 to a sensor hub or external interface 2070 that is used to connect additional devices or subsystems. The devices may include sensors 2072, such as accelerometers, level sensors, flow sensors, optical light sensors, camera sensors, temperature sensors, a global navigation system (e.g., GPS) sensors, pressure sensors, barometric pressure sensors, and the like. The hub or interface 2070 further may be used to connect the edge computing node 2050 to actuators 2074, such as power switches, valve actuators, an audible sound generator, a visual warning device, and the like.

In some optional examples, various input/output (I/O) devices may be present within or connected to, the edge computing node 2050. For example, a display or other output device 2084 may be included to show information, such as sensor readings or actuator position. An input device 2086, such as a touch screen or keypad may be included to accept input. An output device 2084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 2050. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2076 may power the edge computing node 2050, although, in examples in which the edge computing node 2050 is mounted in a fixed location, it may have a power supply coupled to an electrical grid, or the battery may be used as a backup or for temporary capabilities. The battery 2076 may be a lithium-ion battery, or a metal-air battery, such as a zinc-air battery, an aluminum-air battery, a lithium-air battery, and the like.

A battery monitor/charger 2078 may be included in the edge computing node 2050 to track the state of charge (SoCh) of the battery 2076. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2078 may communicate the information on the battery 2076 to the processor 2052 over the interconnect 2056. The battery monitor/charger 2078 may also include an analog-to-digital (ADC) converter that enables the processor 2052 to directly monitor the voltage of the battery 2076 or the current flow from the battery 2076. The battery parameters may be used to determine actions that the edge computing node 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the edge computing node 2050. A wireless battery charging circuit, such as an LTC4020 chip from Linear Technologies of Milpitas, California, among others, may be included in the battery monitor/charger 2078. The specific charging circuits may be selected based on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application-specific integrated circuit (ASIC).

Also in a specific example, the instructions 2082 on the processor 2052 (separately, or in combination with the instructions 2082 of the machine readable medium 2060) may configure execution or operation of a trusted execution environment (TEE) 2095. In an example, the TEE 2095 operates as a protected area accessible to the processor 2052 for secure execution of instructions and secure access to data. Various implementations of the TEE 2095, and an accompanying secure area in the processor 2052 or the memory 2054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the edge computing node 2050 through the TEE 2095 and the processor 2052.

In an example, the instructions 2082 provided via memory 2054, the storage 2058, or the processor 2052 may be embodied as a non-transitory, machine-readable medium 2060 including code to direct the processor 2052 to perform electronic operations in the edge computing node 2050. The processor 2052 may access the non-transitory, machine-readable medium 2060 over the interconnect 2056. For instance, the non-transitory, machine-readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable.

In an example embodiment, the edge computing node 2050 can be implemented using components/modules/blocks 2052-2086 which are configured as IP Blocks. Each IP Block may contain a hardware RoT (e.g., device identifier composition engine, or DICE), where a DICE key may be used to identify and attest the IP Block firmware to a peer IP Block or remotely to one or more of components/modules/blocks 2062-2080. Thus, it will be understood that the node 2050 itself may be implemented as a SoC or standalone hardware package.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 19 and 20 is intended to depict a high-level view of components of a device, subsystem, or arrangement of an edge computing node. However, it will be understood that some of the components shown may be omitted, additional components may be present, and a different arrangement of the components shown may occur in other implementations.

Figure 21:
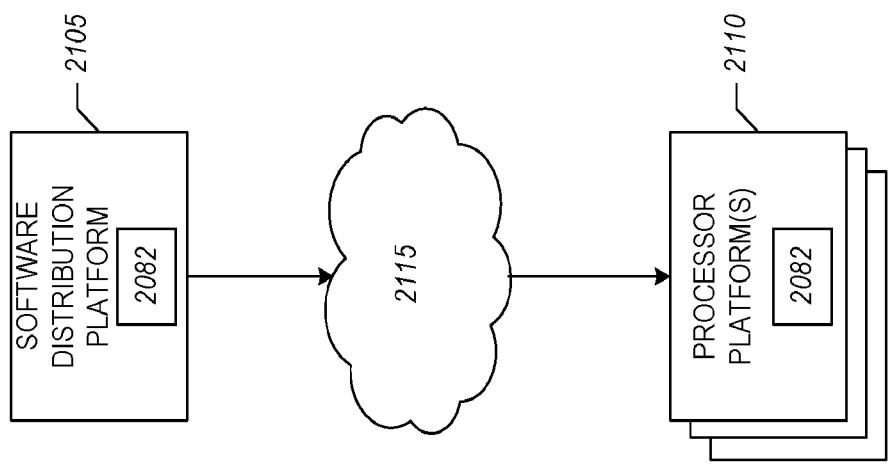
FIG. 21 illustrates a software distribution platform to distribute software instructions and derivatives, according to an example.

FIG. 21 illustrates an example software distribution platform 2105 to distribute software, such as the example computer readable instructions 2082 of FIG. 20, to one or more devices, such as example processor platform(s) 21 and/or other example connected edge devices or systems discussed herein. The example software distribution platform 2105 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 2105). Example connected edge devices may operate in commercial and/or home automation environments. In some examples, a third party is a developer, a seller, and/or a licensor of software such as the example computer readable instructions 2082 of FIG. 20. The third parties may be consumers, users, retailers. OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 21, the software distribution platform 2105 includes one or more servers and one or more storage devices that store the computer readable instructions 2082. The one or more servers of the example software distribution platform 2105 are in communication with a network 2115, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2082 from the software distribution platform 2105. For example, the software, which may correspond to example computer readable instructions, may be downloaded to the example processor platform(s), which is/are to execute the computer readable instructions 2082. In some examples, one or more servers of the software distribution platform 2105 are communicatively connected to one or more security domains and/or security devices through which requests and transmissions of the example computer readable instructions 2082 must pass. In some examples, one or more servers of the software distribution platform 2105 periodically offer, transmit, and/or force updates to the software (e.g., the example computer readable instructions 2082 of FIG. 20) to ensure improvements, patches, updates, etc. are distributed and applied to the software at the end user devices.

In the illustrated example of FIG. 21, the computer readable instructions 2082 are stored on storage devices of the software distribution platform 2105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 2082 stored in the software distribution platform 2105 are in a first format when transmitted to the example processor platform(s) 2110. In some examples, the first format is an executable binary in which particular types of the processor platform(s) 2110 can execute. However, in some examples, the first format is uncompiled code that requires one or more preparation tasks to transform the first format to a second format to enable execution on the example processor platform(s) 2110. For instance, the receiving processor platform(s) 2100 may need to compile the computer readable instructions 2082 in the first format to generate executable code in a second format that is capable of being executed on the processor platform(s) 2010. In still other examples, the first format is interpreted code that, upon reaching the processor platform(s) 2110, is interpreted by an interpreter to facilitate execution of instructions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system at a trust service provider, comprising: communication circuitry to receive a communication from a requesting party; and processing circuitry to perform operations that: identify the communication as a request for attestation evidence of a compute configuration of the requesting party, the attestation evidence to provide trust claims for the requesting party to be evaluated by a relying party, wherein the requesting party is located in a first operational domain, wherein the relying party is located in a second operational domain, and wherein the trust service provider is located at a third operational domain; create an attestation token based on an attestation policy associated with the relying party, the attestation token providing a proof of trust for the trust claims in connection with at least one trusted computing component at the requesting party; and provide the attestation token to the requesting party, to enable the requesting party to present the attestation token to the relying party as the proof of trust for the trust claims.

In Example 2, the subject matter of Example 1 optionally includes subject matter where in response to providing of the attestation token to requesting party, the requesting party forwards the attestation token to the relying party, and the relying party verifies the trust claims based on the attestation token.

In Example 3, the subject matter of Example 2 optionally includes subject matter where the relying party controls access to a resource based on verifying the trust claims.

In Example 4, the subject matter of any one or more of Examples 2-3 optionally include subject matter where the relying party performs a communication session with the requesting party based on verifying the trust claims.

In Example 5, the subject matter of any one or more of Examples 1-4 optionally include subject matter where the request for attestation evidence is provided from the requesting party to the trust service provider in response to a request for the proof of trust provided from the relying party to the requesting party.

In Example 6, the subject matter of any one or more of Examples 1-5 optionally include subject matter where the attestation policy specifies requirements for proof of attestation.

In Example 7, the subject matter of any one or more of Examples 1-6 optionally include subject matter where the operations are performed by an attestation service at the trust service provider, and wherein the attestation service operates with one or more microservices.

In Example 8, the subject matter of any one or more of Examples 1-7 optionally include subject matter where the first operational domain corresponds to a first compute environment controlled by a first cloud service provider, wherein the second operational domain corresponds to a second compute environment controlled by a second cloud service provider, and wherein the third operational domain corresponds to a third compute environment controlled by the trust service provider.

In Example 9, the subject matter of any one or more of Examples 1-8 optionally include subject matter where the compute configuration of the requesting party relates to use of a trusted execution environment at the requesting party.

In Example 10, the subject matter of any one or more of Examples 1-9 optionally include subject matter where operations of receiving the request, creating the attestation token, and providing the attestation token, are repeated on behalf of the requesting party, to obtain additional attestation evidence that provides additional trust claims for the relying party to be evaluated by the requesting party, to enable the relying party and the requesting party to perform mutual attestation.

Example 11 is a method for generating proof of attestation, performed at a trust service provider, comprising: receiving a request from a requesting party for attestation evidence of a compute configuration of the requesting party, the attestation evidence to provide trust claims for the requesting party to be evaluated by a relying party, wherein the requesting party is located in a first operational domain, wherein the relying party is located in a second operational domain, and wherein the trust service provider is located at a third operational domain; creating an attestation token based on an attestation policy associated with the relying party, the attestation token providing a proof of trust for the trust claims in connection with at least one trusted computing component at the requesting party; and providing the attestation token to the requesting party, to enable the requesting party to present the attestation token to the relying party as the proof of trust for the trust claims.

In Example 12, the subject matter of Example 11 optionally includes subject matter where in response to providing of the attestation token to requesting party, the requesting party forwards the attestation token to the relying party, and the relying party verifies the trust claims based on the attestation token.

In Example 13, the subject matter of Example 12 optionally includes subject matter where the relying party controls access to a resource based on verifying the trust claims.

In Example 14, the subject matter of any one or more of Examples 12-13 optionally include subject matter where the relying party performs a communication session with the requesting party based on verifying the trust claims.

In Example 15, the subject matter of any one or more of Examples 11-14 optionally include subject matter where the request for attestation evidence is provided from the requesting party to the trust service provider in response to a request for the proof of trust provided from the relying party to the requesting party.

In Example 16, the subject matter of any one or more of Examples 11-optionally include subject matter where the attestation policy specifies requirements for proof of attestation.

In Example 17, the subject matter of any one or more of Examples 11-16 optionally include subject matter where the method is performed by an attestation service at the trust service provider, and wherein the attestation service operates with one or more microservices.

In Example 18, the subject matter of any one or more of Examples 11-17 optionally include subject matter where the first operational domain corresponds to a first compute environment controlled by a first cloud service provider, wherein the second operational domain corresponds to a second compute environment controlled by a second cloud service provider, and wherein the third operational domain corresponds to a third compute environment controlled by the trust service provider.

In Example 19, the subject matter of any one or more of Examples 11-18 optionally include subject matter where the compute configuration of the requesting party relates to use of a trusted execution environment at the requesting party.

In Example 20, the subject matter of any one or more of Examples 11-19 optionally include subject matter where operations of receiving the request, creating the attestation token, and providing the attestation token, are repeated on behalf of the requesting party, to obtain additional attestation evidence that provides additional trust claims for the relying party to be evaluated by the requesting party, to enable the relying party and the requesting party to perform mutual attestation.

Example 21 is at least one machine-readable storage medium comprising instructions stored thereupon, which when executed by processing circuitry of a computing device, cause the processing circuitry to perform the methods of any of Examples 11 to 20.

Example 22 is an apparatus operated at a trust service provider, comprising: means for obtaining a request from a requesting party for attestation evidence of a compute configuration of the requesting party, the attestation evidence providing trust claims for the requesting party to be evaluated by a relying party, wherein the requesting party is located in a first operational domain, wherein the relying party is located in a second operational domain, and wherein the trust service provider is located at a third operational domain; means for creating an attestation token based on an attestation policy associated with the relying party, the attestation token providing a proof of trust for the trust claims in connection at least one trusted computing component at the requesting party; and means for communicating the attestation token to the requesting party, to enable the requesting party to present the attestation token to the relying party as the proof of trust for the trust claims.

In Example 23, the subject matter of Example 22 optionally includes means for causing the requesting party to forward the attestation token to the relying party, in response to providing of the attestation token to requesting party, wherein the relying party verifies the trust claims based on the attestation token.

In Example 24, the subject matter of any one or more of Examples 22-23 optionally include means for orchestrating an attestation service with one or more microservices, to process the request based on the attestation policy associated with the relying party or an attestation policy associated with the requesting party.

In Example 25, the subject matter of any one or more of Examples 22-24 optionally include means for processing a subsequent request for attestation on behalf of the requesting party, to obtain additional attestation evidence that provides additional trust claims for the relying party to be evaluated by the requesting party, to enable the relying party and the requesting party to perform mutual attestation.

Example 26 is a device, comprising: processing circuitry; and a memory device including instructions embodied thereon, wherein the instructions, which when executed by the processing circuitry, configure the processing circuitry for implementing a trust authority or trust attestation verification operations, in accordance with the operations or techniques in Examples 1-25 or discussed herein.

Example 27 is a method, comprising a plurality of operations executed with a processor and memory of a device, to perform trust authority or trust attestation verification operations, in accordance with the operations or techniques in Examples 1-25 or discussed herein.

Example 28 is a non-transitory device-readable storage medium comprising information representative of instructions, wherein the instructions, when executed by processing circuitry of a device, cause the processing circuitry for implementing trust authority or trust attestation verification operations, in accordance with the operations or techniques in Examples 1-25 or discussed herein.

Example 29 is an apparatus, comprising a plurality of means for operating a data processing system, including for implementing a trust authority or trust attestation verification operations, in accordance with the operations or techniques in Examples 1-25 or discussed herein.

Example 30 is an edge/edge-cloud/hybrid-cloud computing system adapted to perform the operations or techniques discussed herein.

Example 31 is a federated set of edge/edge-cloud computing systems adapted to perform the operations or techniques in Examples 1-25 or discussed herein.

Example 32 is a remote service server adapted to perform the operations of a remote service invoked by the operations or techniques in Examples 1-25 or discussed herein.

Example 33 is a network comprising respective devices and device communication mediums for performing any of the operations or techniques in Examples 1-25 or discussed herein.

Example 34 is a system comprising respective components arranged or configured to perform any of the operations or techniques in Examples 1-25 or discussed herein.

Example 35 is a method, performed using specially configured circuitry of a device, arranged or configured to perform any of the operations or techniques in Examples 1-25 or discussed herein.

Implementation of the preceding techniques may be accomplished through any number of specifications, configurations, or example deployments of hardware and software. It should be understood that the functional units or capabilities described in this specification may have been referred to or labeled as components or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

In the above Detailed Description, various features may be grouped to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system at a trust service provider, comprising:
    communication circuitry to receive a communication from a requesting party; and
    processing circuitry to perform operations that:
        identify the communication as a request for attestation evidence of a compute configuration of the requesting party, the attestation evidence to provide trust claims for the requesting party to be evaluated by a relying party,
        wherein the requesting party is located in a first operational domain, wherein the relying party is located in a second operational domain, and wherein the trust service provider is located at a third operational domain;
        create an attestation token based on an attestation policy associated with the relying party, the attestation token providing a proof of trust for the trust claims in connection with at least one trusted computing component at the requesting party; and
        provide the attestation token to the requesting party, to enable the requesting party to present the attestation token to the relying party as the proof of trust for the trust claims.

2. The computing system of claim 1, wherein in response to providing of the attestation token to requesting party, the requesting party forwards the attestation token to the relying party, and the relying party verifies the trust claims based on the attestation token.

3. The computing system of claim 2, wherein the relying party controls access to a resource based on verifying the trust claims.

4. The computing system of claim 2, wherein the relying party performs a communication session with the requesting party based on verifying the trust claims.

5. The computing system of claim 1, wherein the request for attestation evidence is provided from the requesting party to the trust service provider in response to a request for the proof of trust provided from the relying party to the requesting party.

6. The computing system of claim 1, wherein the attestation policy specifies requirements for proof of attestation.

7. The computing system of claim 1, wherein the operations are performed by an attestation service at the trust service provider, and wherein the attestation service operates with one or more microservices.

8. The computing system of claim 1, wherein the first operational domain corresponds to a first compute environment controlled by a first cloud service provider, wherein the second operational domain corresponds to a second compute environment controlled by a second cloud service provider, and wherein the third operational domain corresponds to a third compute environment controlled by the trust service provider.

9. The computing system of claim 1, wherein the compute configuration of the requesting party relates to use of a trusted execution environment at the requesting party.

10. The computing system of claim 1, wherein operations of receiving the request, creating the attestation token, and providing the attestation token, are repeated on behalf of the requesting party, to obtain additional attestation evidence that provides additional trust claims for the relying party to be evaluated by the requesting party, to enable the relying party and the requesting party to perform mutual attestation.

11. A method for generating proof of attestation, performed at a trust service provider, comprising:
    receiving a request from a requesting party for attestation evidence of a compute configuration of the requesting party, the attestation evidence to provide trust claims for the requesting party to be evaluated by a relying party,
    wherein the requesting party is located in a first operational domain, wherein the relying party is located in a second operational domain, and wherein the trust service provider is located at a third operational domain;
    creating an attestation token based on an attestation policy associated with the relying party, the attestation token providing a proof of trust for the trust claims in connection with at least one trusted computing component at the requesting party; and
    providing the attestation token to the requesting party, to enable the requesting party to present the attestation token to the relying party as the proof of trust for the trust claims.

12. The method of claim 11, wherein in response to providing of the attestation token to requesting party, the requesting party forwards the attestation token to the relying party, and the relying party verifies the trust claims based on the attestation token.

13. The method of claim 12, wherein the relying party controls access to a resource based on verifying the trust claims.

14. The method of claim 12, wherein the relying party performs a communication session with the requesting party based on verifying the trust claims.

15. The method of claim 11, wherein the request for attestation evidence is provided from the requesting party to the trust service provider in response to a request for the proof of trust provided from the relying party to the requesting party.

16. The method of claim 11, wherein the attestation policy specifies requirements for proof of attestation.

17. The method of claim 11, wherein the method is performed by an attestation service at the trust service provider, and wherein the attestation service operates with one or more microservices.

18. The method of claim 11, wherein the first operational domain corresponds to a first compute environment controlled by a first cloud service provider, wherein the second operational domain corresponds to a second compute environment controlled by a second cloud service provider, and wherein the third operational domain corresponds to a third compute environment controlled by the trust service provider.

19. The method of claim 11, wherein the compute configuration of the requesting party relates to use of a trusted execution environment at the requesting party.

20. The method of claim 11, wherein operations of receiving the request, creating the attestation token, and providing the attestation token, are repeated on behalf of the requesting party, to obtain additional attestation evidence that provides additional trust claims for the relying party to be evaluated by the requesting party, to enable the relying party and the requesting party to perform mutual attestation.

* * * * *